(12) United States Patent
Matsuda et al.

(10) Patent No.: US 6,577,328 B2
(45) Date of Patent: Jun. 10, 2003

(54) PROGRAM PROVIDING MEDIUM AND SHARED VIRTUAL SPACE PROVIDING APPARATUS AND METHOD

(75) Inventors: Koichi Matsuda, Tokyo (JP); Hiroyuki Hanaya, Saitama (JP)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 09/084,183

(22) Filed: May 26, 1998

(65) Prior Publication Data

US 2002/0186244 A1 Dec. 12, 2002

(30) Foreign Application Priority Data

May 28, 1997 (JP) .............................. 9-154471

(51) Int. Cl.[7] .................................................. G09G 5/00
(52) U.S. Cl. ...................... 345/757; 345/753; 345/419; 345/473; 345/848; 709/204; 709/205
(58) Field of Search ................................. 709/206, 207, 709/204, 205; 345/435, 449, 433, 329, 355, 753, 757, 419, 473, 848; 379/105, 53, 54

(56) References Cited

U.S. PATENT DOCUMENTS

| | | | | |
|---|---|---|---|---|
| 5,109,407 A | * | 4/1992 | Fujita et al. ................. | 379/105 |
| 5,393,070 A | | 2/1995 | Best ............................ | 273/434 |
| 5,572,646 A | | 11/1996 | Kawai et al. ................ | 395/501 |
| 5,586,257 A | | 12/1996 | Perlman ...................... | 463/42 |
| 5,659,691 A | | 8/1997 | Durward et al. ............ | 395/329 |
| 5,727,950 A | | 3/1998 | Cook et al. .................. | 434/350 |
| 5,754,740 A | | 5/1998 | Fukuoka et al. ............. | 395/68 |
| 5,761,644 A | | 6/1998 | Ueda et al. .................. | 705/1 |
| 5,802,296 A | | 9/1998 | Morse et al. ........... | 395/200.38 |
| 5,812,126 A | | 9/1998 | Richardson et al. ........ | 345/330 |
| 5,848,134 A | | 12/1998 | Sekiguchi et al. ........ | 379/93.15 |
| 5,850,352 A | | 12/1998 | Moezzi et al. .......... | 364/514 A |
| 5,880,731 A | | 3/1999 | Liles et al. .................. | 345/349 |
| 5,926,179 A | | 7/1999 | Matsuda et al. ............. | 345/355 |
| 5,941,770 A | | 8/1999 | Miers et al. ................. | 463/13 |
| 5,956,028 A | * | 9/1999 | Matsui et al. ............... | 345/329 |
| 5,956,038 A | | 9/1999 | Rekimoto .................... | 345/419 |
| 5,956,485 A | | 9/1999 | Perlman ................. | 395/200.34 |
| 5,966,129 A | | 10/1999 | Matsukuma et al. ........ | 345/418 |
| 5,966,526 A | | 10/1999 | Yokoi .................... | 395/500.32 |
| 5,971,855 A | | 10/1999 | Ng .............................. | 463/42 |
| 5,982,372 A | | 11/1999 | Brush, II et al. ........... | 345/418 |
| 5,983,003 A | | 11/1999 | Lection et al. ......... | 395/200.32 |
| 6,009,460 A | | 12/1999 | Ohno et al. ................. | 709/204 |
| 6,057,856 A | * | 5/2000 | Miyashita et al. .......... | 345/435 |
| 6,141,019 A | * | 10/2000 | Roseborough et al. ..... | 345/473 |
| 6,175,857 B1 | * | 1/2001 | Hachiya et al. ............. | 709/206 |

FOREIGN PATENT DOCUMENTS

| | | | | |
|---|---|---|---|---|
| JP | 7-160853 | 6/1995 | ........... | G06F/15/62 |
| JP | 9-81781 | 3/1997 | ........... | G06F/15/62 |

OTHER PUBLICATIONS

M. Pesce, "VRML Browsing & Building Cyberspace," New Riders Publishing 1995, pp. 43–81.

(List continued on next page.)

Primary Examiner—Ayaz Sheikh
Assistant Examiner—Oanh Duong
(74) Attorney, Agent, or Firm—Oblon, Spivak, McClelland, Maier & Neustadt, P.C.

(57) ABSTRACT

To remotely control a virtual reality creature. A shared server provides a shared virtual reality space to client PCs. An AO server controls a growth parameter of the virtual life object existing in this shared virtual reality space to control autonomous behavior of the virtual life object. A communication server sends a message to a user of each of the client PCs who is the keeper of the virtual life object according to a status transition thereof through telephone or facsimile for example.

20 Claims, 21 Drawing Sheets

OTHER PUBLICATIONS

Nikkei Electronics, No. 686, Apr. 7, 1997, pp. 131–134.

Nikkei Electronics, No. 670, Sep. 9, 1996, pp. 151–159.

S. Chen et al., "The Out of Box Experience: Lessons Learned Creating Compelling VRML, 2.0 Content," Proceedings of the Second Symposium on Virtual Reality Modeling Language, Feb. 1997, pp. 83–92.

B. Damer et al., Peopled Online Virtual Worlds: A New Home for Cooperating Communities, A New Frontier for Interaction Design (Panel), Proceedings of the ACM Conference on Computer Supporter Cooperative Work, Nov. 1996, pp. 441–442.

S. Harrison et al., "Re–Placeing Space: The Roles of Place and Space in Collaborative Systems," Proceedings of the ACM Conference on Computer Supporter Cooperative Work, Nov. 1996, pp. 67–76.

R. Lea et al., "Community Place: Architecture and Performance," Proceedings of the Second Symposium on Virtual Reality Modeling Language, Feb. 1996, pp. 41–50.

B. Damer, Inhabited Virtual Worlds: A New Frontier for Interaction Design, Interactions, vol. 3, Issue 5, Sep./Oct. 1996, pp. 27–34.

W. Broll., "Populating the Internet: Supporting Multiple Users and Shared Applications with VRML," Proceedings of the Second Symposium on Virtual Reality Modeling Language, Feb. 1997, pp. 33–40.

D. Kurlander et al., "Comic Chat," Proceedings of the 23rd Annual Conference on Computer Graphics, Aug. 1996, pp. 225–236.

Ultima III Manual and Selected Pages from Ultima I–VIII, Collection Maual.

K. Perlin et al., "Improv: a System for Scripting Interactive Actors in Virtual Worlds," Proceedings of the 23rd Annual Conference on Computer Graphics, Aug. 1996, pp. 205–216.

M. Benedikt (Editor), "Cyberspace: First Steps," The MIT Press Publishers 1991, Fourth Printing, 1992, pp. 273–300.

K. Matsuda. "Latest Trends of VRML and Cyberpassage VRML 2.0 and JAVA," Part 1, BIT, vol. 28, No. 7, Jul. 1996, pp. 29–36, English Translation pp. 1–25.

K. Matsuda, "Latest Trends of the VRML and Cyberpassage VRML 2.0 and JAVA," Part 2, BIT, vol. 28, No. 8, Aug. 1996, pp. 57–65, English Translation pp. 1–27.

Y. Honda, "Latest Trends of VRML and Cyberpassage VRML + Network = Cyberspace?" Part 3, BIT, vol. 28, No. 9, Sep. 1996, pp. 29–36, English Translation pp. 1–.

Y. Honda, "Latest Trends of VRML and Cyberpassage How to Build Multi–User Environment Using Cyberspace," Part 4, BIT, vol. 28, No. 10, pp. 49–58, English Translation pp. 1–27.

"Sony Begins OEM Sales of Community Place VRML 2.0 3D Internet Browser and Multi–User Server Software," Jan. 30, 1997 Press Release, Material Collected From the Internet, http://www.world.sony.com/corporateinfo/news–e/199701/9701–30/index.html, 3 pages.

"VRML 2.0 Laboratory—How to Create," Material Collected from the Internet, Mar. 8, 2000, http://www.ses.co.jp/ses/staff/kan/howto/howto1.html, 5 pages.

Virtual Reality Modeling Language Version 2.0, ISO/IEC CD 14772, Aug. 4, 1996, Section 4, "Concepts".

"Web–on–Call Voice Browser" Product Background, General Magic, Material Collected from the Internet, Mar. 12, 2000, http://www.pngcomputers.com/webon.htm.

U.S. patent application Ser. No. 09/227,689, filed Jan. 8, 1999.

U.S. patent application Ser. No. 09/084,515, filed May 26, 1998.

U.S. patent application Ser. No. 09/228,135, filed Jan. 11, 1999.

U.S. patent application Ser. No. 09/228,086, filed Jan. 11, 1999.

U.S. patent application Ser. No. 09/135,830, filed Aug. 18, 1998.

U.S. patent application Ser. No. 09/229,819, filed Jan. 13, 1999.

U.S. patent application Ser. No. 09/081,147, filed May 19, 1998.

U.S. patent application Ser. No. 09/229,818, filed Jan. 13, 1999.

U.S. patent application Ser. No. 09/205,947, filed Dec. 4, 1998.

U.S. patent application Ser. No. 09/418,393, filed Oct. 14, 1999.

* cited by examiner

FIG. 2

ROUTE Node Name.event Out Name TO Node Name.event In Name
       (NODE NAME) (EVENT-OUT   (NODE NAME) (EVENT-IN
(ROUTE              NAME)                    NAME)
DECLARATION)

FIG. 8

GROWTH PARAMETER CONTROL TABLE

| NO | VIRTUAL LIFE DATA ||||||| KEEPER DATA |||| RESERVE |
|----|---|---|---|---|---|---|---|---|---|---|---|---|
| | 3D OBJECT ID | COORDI-NATE VALUES | TYPE | SEX | NICK-NAME | BIRTH DATE | LEGAL DOMICILE WORLD | GROWTH PARAMETER || NAME | CONTACT MEANS | ADDRESS OF CONTACT | |
| | | | | | | | | PHYSICAL PARAMETER | MENTAL PARAMETER | | | | |
| 1 | Obj1 | x1,y1,z1 | MONKEY | MALE | TARO | 970112 | ZOO | | | HIROYUKI HANAYA | 0 | hanaya@ipd.sony.co.jp | |
| 2 | Obj1 | x2,y2,z2 | CAT | FEMALE | MIKE | 970210 | PARK | | | KOUICH MATSUDA | 1 | 03-5448-4443 | |

| | CONTACT MEANS |
|---|---|
| 0 | ELECTRONIC MAIL |
| 1 | TELEPHONE (ANALOG VOICE) |
| 2 | PHS MAIL SERVICE |
| 3 | FACSIMILE |
| 4 | PAGER |
| 5 | RESERVED |
| 6 | RESERVED |
| 7 | RESERVED |

| HEIGHT cm | WEIGHT kg | PHYSIQUE INDEX | APPETITE INDEX | HEALTH INDEX | REMAINING LIFE TIME |
|---|---|---|---|---|---|
| 50 | 10 | 5/10 | 6/10 | 4/10 | 240 |

| INTELLIGENT QUOTIENT | LANGUAGE PROFICIENCY INDEX | SOCIABILITY INDEX | INDEPEN-DENCE INDEX | ACTIVITY INDEX | MOOD INDEX |
|---|---|---|---|---|---|
| 2/10 | 5/10 | 2/10 | 1/10 | 5/10 | 5/10 |

FIG. 14
MOOD INDEX
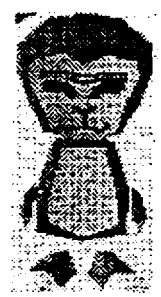
↕
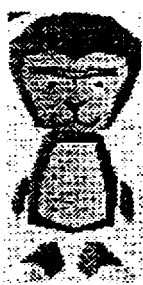
↕
GOOD
↑
↓
BAD

PROGRAM PROVIDING MEDIUM AND SHARED VIRTUAL SPACE PROVIDING APPARATUS AND METHOD

BACKGROUND OF THE INVENTION

1. Field of the Invention

The present invention generally relates to a program providing medium, a shared virtual space providing apparatus, and a shared virtual space providing method. More particularly, the present invention relates to a program providing medium, a shared virtual space providing apparatus, and a shared virtual space providing method that are adapted to remotely acquire information associated with the growth process of a virtual creature and remotely breed the same.

2. Description of Related Art

A cyberspace service named Habitat (registered trademark) is known in so-called personal computer communications services such as NIFTY-Serve (registered trademark) of Japan and CompuServe (registered trademark) of US in which a plurality of users connect their personal computers via modems and public telephone networks to the host computers installed at the centers of the services to access them in predetermined protocols. Development of Habitat started in 1985 by Lucas Film of the US, operated by Quantum Link, one of US commercial networks, for about three years. Then, Habitat started its service in NIFTY-Serve as Fujitsu Habitat (trademark) in February 1990.

In Habitat, users can send their alter egos called avatars (the incarnation of a god figuring in the Hindu mythology) into a virtual city called Populopolis drawn by two-dimensional graphics to have a chat (namely, a realtime conversation based on text entered and displayed) with each other. For further details of Habitat, refer to the Japanese translation "pp. 282–307" of "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010.

In the conventional cyberspace systems operated by personal computer communications services such as mentioned above, a virtual street and the inside of a room for example are drawn in two-dimensional graphics. Therefore, moving an avatar in the depth direction is realized simply by moving it up and down in the background of the two-dimensional graphics. This results in a poor expression in simulating walking and movement in a virtual space. Also, the two-dimensional virtual space in which own avatar and the avatar of another user are displayed is viewed from a viewpoint of a third party, thereby impairing the sense of simulated experience.

To overcome this drawback, a capability that enables a user to walk as desired with the viewpoint of the avatar of the user in a virtual space represented in three-dimensional graphics is realized by use of a three-dimensional graphics data description language called VRML (Virtual Reality Modeling Language) as disclosed in Japanese Patent Laid-open No. Hei 9-81781 corresponding to U.S. patent application Ser. No. 678,340. Considerations about various cyberspaces in which chat is made by use of the avatar of a user are described in NIKKEI Electronics, Sep. 9, 1996, No. 670, pp. 151–159.

Recently, breeding simulation games for breeding tropical fish and a virtual creature having artificial intelligence living in a virtual world for example have come to be available as personal computer software programs. A product is also known that displays a simulated pet such as a dog or a cat on an electronic notepad to enjoy the process of its growth (refer to NIKKEI Electronics, Apr. 7, 1997, No. 686, pp. 131–134). In addition, "Tamagotchi" (registered trademark) developed and commercialized by Bandai Co. is widely known that is an egg-sized portable virtual reality pet with a breeding simulation game program as mentioned above incorporated.

Virtual reality pets of this type have a CPU (Central Processing Unit), a ROM (Read Only Memory), a RAM (Random Access Memory) and so on mounted on a single-chip LSI (Large Scale Integration), a breeding simulation game program being stored in the ROM, the figure and state of the pet being displayed on an LCD (Liquid Crystal Display) device. The user gives such instructions by operating buttons as "feed" and "broom" for example necessary for breeding the virtual reality creature as a pet. As a result of caring, the virtual reality creature displayed on the LCD grows stepwise from an egg to a chick to a grown-up bird for example in its external view.

The virtual reality creature is programmed such that proper instructions given help the virtual reality creature grow without problem and improper instructions given make it sick or, in the worst case, die. Further, the virtual reality creature is programmed to make various requests based on the time elapsing from its birth provided by an incorporated calendar timer. For example, in the nighttime zone, the virtual reality creature requests a sleep and, in the mealtime zone, it requests food. In other times, the virtual reality creature requests, at random, snack and play for example. If the user fails to answer these requests properly, the growth of the virtual reality creature may be retarded or its character worsens. If the user answers properly, the life of the virtual reality creature is lengthened.

Meanwhile, Japanese Patent Laid-open No. Hei 07-160853 corresponding to U.S. Pat. No. 5,572,646 discloses a technology applicable to an electronic notepad for example for displaying images according to the growth processes of a virtual reality creature such as an animal or a plant. To be more specific, bit-map images representing the growth processes of a plant character for example are stored in the ROM in the electronic notepad. The plant character according to the degree of growth is displayed on the LCD of the electronic notepad and, at the same time, characters representing plant growing elements (water, light, and fertilizer for example) are displayed. Necessary amounts of these growing elements are inputted by operating corresponding keys on the electronic notepad. The inputted values are set to a water amount register, a light amount register, and a fertilizer amount register respectively in the RAM of the electronic notepad. Based on the values set to these registers, a new degree of growth is computed. Then, the plant character corresponding to the computed degree of growth is read from the ROM to be displayed on the LCD. Thus, the plant growth process according to the state of cultivation by the user is displayed.

However, the above-mentioned virtual reality pet or the electronic notepad for breeding a virtual creature described in Japanese Patent Laid-open No. Hei 07-160853 supposes application to a standalone apparatus that operates as one independent unit. Therefore, the existing space or breeding environment of the virtual creature is concluded in that apparatus. In the above-mentioned technologies, a programmed virtual creature is handled as one entity and a breeding simulation game progresses between the owner or keeper of the virtual reality pet and the same in a one-to-one relation. This presents problems that the owner or other users cannot remotely acquire the information associated with the growth process of the virtual creature and remotely breed the same.

SUMMARY OF THE INVENTION

It is therefore an object of the present invention to provide a program providing medium, a shared virtual space providing apparatus, and a shared virtual space providing method that allow the user to remotely acquire the information associated with a virtual creature and remotely breed the same.

In carrying out the invention and according to one aspect thereof, there is provided a program providing medium described in claim 1, the program including the steps of: controlling a communication control table in which a user of the client apparatus who is a keeper of the virtual life object, a notification method of sending a message to the keeper, and an address of contact of the keeper are registered; and sending the message to the address of contact according to a status transition of the virtual life object by use of the notification method registered in the communication control table.

In carrying out the invention and according to another aspect thereof, there is provided a shared virtual space providing apparatus described in claim 10, including: a control means for controlling a communication control table in which a user of each of the plurality of client apparatuses who is a keeper of the virtual life object, a notification method of sending a message to the keeper, and an address of contact of the keeper are registered; and a sending means for sending the message to the keeper at the address of contact registered in the communication control table according to a status transition of the virtual life object by use of the notification method registered in the communication control table.

In carrying out the invention and according to still another aspect thereof, there is provided a shared virtual space providing method described in claim 11, including the steps of: controlling a communication control table in which a user of each of the plurality of client apparatuses who is a keeper of the virtual life object, a notification method of sending a message to the keeper, and an address of contact of the keeper are registered; and sending the message to the keeper at the address of contact registered in the communication control table according to a status transition of the virtual life object by use of the notification method registered in the communication control table.

In the program providing medium described in claim 1, the shared virtual space providing apparatus described in claim 10, and the shared virtual space providing method described in claim 11, the notification method for sending a message to the keeper of the virtual life object and the address of contact of the keeper are registered in the communication control table. According to the status transition of the virtual life object, the message is sent to the keeper at his or her address of contact by use of the notification method registered in the communication control table.

BRIEF DESCRIPTION OF THE DRAWINGS

These and other objects of the invention will be seen by reference to the description, taken in connection with the accompanying drawing, in which:

FIG. 2 is a diagram illustrating a routing;

FIG. 8 is a diagram illustrating an example of a growth parameter control table;

FIG. 14 is a diagram for describing virtual life object mood index;

DETAILED DESCRIPTION OF PREFERRED EMBODIMENTS

Figure 1:
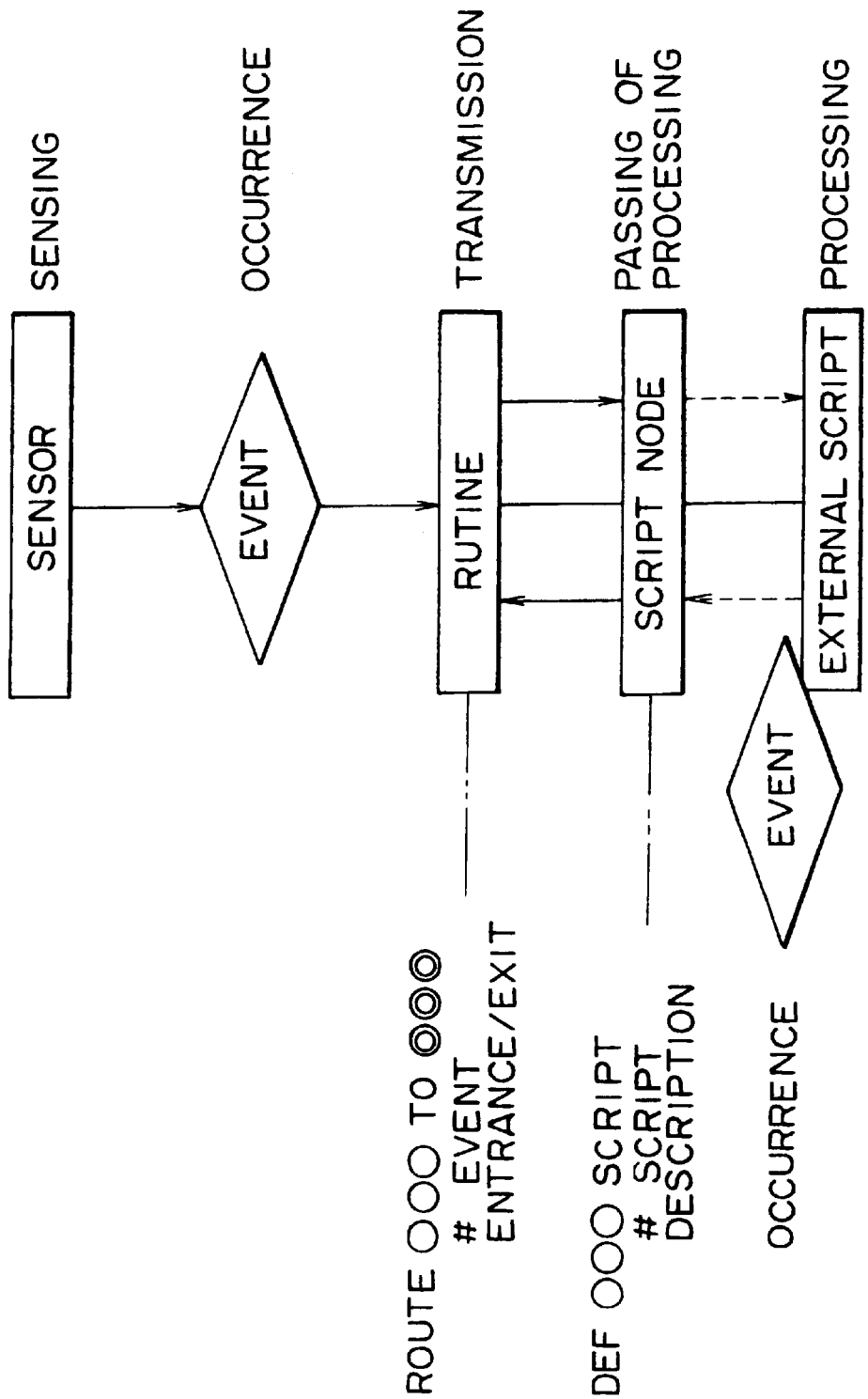
FIG. 1 is a diagram illustrating a relationship between a sensor, an event, a routing, and a script.

This invention will be described in further detail by way of example with reference to the accompanying drawings.

First, there will be described VRML (Virtual Reality Modeling Language), which is a descriptive language enabling users to integrally handle three-dimensional information by use of the framework of the WWW (World Wide Web) for providing a variety of information through the Internet, a computer network built worldwide.

Meanwhile, for an information providing system available on the Internet, the WWW developed by CERN (European Center for Nuclear Research) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW server is constituted by server software called an HTTP daemon and an HTML file in which hyper text information is stored. The wording "daemon" means a program for executing management and processing in the background upon working on UNIX. The hyper text information is described in a description language called HTML (Hyper Text Makeup Language). In the description of a hypertext by HTML, a logical structure of a document is expressed in a format specification called a tag enclosed by "<" and ">". Description of linking to other information is made based on link information called an anchor. A method in which a location at which required information is stored by the anchor is URL (Uniform Resource Locator).

A protocol for transferring a file described in HTML on the TCP/IP (Transmission Control Protocol/Internet Protocol) network is HTTP. This protocol has a capability of transferring a request for information from a client to the WWW server and the requested hyper text information stored in the HTML file to the client.

Used by many as an environment for using the WWW is client software such as Netscape Navigator (trademark of Netscape Communications Corp.) called a WWW browser.

Use of the WWW browser allows users to browse files, which are called home pages, corresponding to URLs stored in WWW servers on the Internet built worldwide, thereby performing net-surfing by sequentially following home pages linked to each other to access a variety of WWW information sources.

Recently, a VRML browser has been developed by extending this WWW. The VRML browser displays a three-dimensional space described in a three-dimensional graphics language called VRML that enables description of a three-dimensional space and setting of hypertext links to objects drawn in three-dimensional graphics, thereby allowing users to follow these links to sequentially access WWW servers.

Details of VRML are described in the Japanese translation of "VRML: Browsing & Building Cyberspace," Mark Pesce, 1995, New Readers Publishing, ISBN 1-56205-498-8, the translation being entitled "Getting to Know VRML: Building and Browsing Three-Dimensional Cyberspace," translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published Mar. 25, 1996, Prenticehall Publishing, ISBN4-931356-37-0, as well as "Most Recent Trend of VRML And CyberPassage," Koichi Matsuda and Yasuaki Honda, the bit Magazine, Kyoritsu Publishing, 1996, Vol. 28, No. 7, pp. 29–36, No. 8, pp. 57–65, No. 9, pp. 29–36, No. 10, pp. 49–58.

The authorized and complete specifications of the Virtual Reality Modeling Language Version 2.0, ISO/IEC CD 14772 released on Aug. 4, 1996 is made public in ht tp://webspace.sgi.com/moving-worlds/spec/index.html and its Japanese version is made public in http://www.webcity.co.jp/info/andoh/VRML/vrml2.0/spec-jp/index.html.

Further, for the browser for VRML 2.0 and the software for shared server, Sony Corporation, the present applicant, has developed and commercialized as "Community Place Browser/Bureau (registered trademark), of which beta version is downloadable from the Internet home page of Sony, http://vs.sony.co.jp.

To build a three-dimensional space by use of VRML 2.0, a VRML file for representing a desired content is created by generating graphics data indicative of the shape and behavior of an object (or a model) in the virtual space by use of VRML (model creation), adding the model in the virtual space displayed on the screen to a switch (or a sensor) for generating an event when the user clicks the model with the mouse for example, programming (or scripting) a script for realizing an event to be generated when the sensor is pointed, and relating (or routing) between graphics data and script (hereafter, common nodes such as write specified in graphics data, script, and VRML are also generically referred to as nodes) such as operating the sensor and starting the script.

For example, http://www.ses.co.jp/SES/STAFF/kan/howto/howto1.html describes in detail a method of writing VRML 2.0 and provides sample data.

The following describes a mechanism for realizing an autonomous behavior in a VRML space, a new capability added to the second generation VRML 2.0, not found in the first generation VRML 1.0.

VRML 2.0 realizes an autonomous movement (Behavior) of an object according to an event to be caused by an operation performed on the object arranged in a three-dimensional virtual reality space and a timer event that occurs when a preset time has been reached. The mechanism of this Behavior is realized by the cooperation of three elements; sensor, routing, and script as follows.

(1) A sensor node described as a VRML file related to a node such as an object arranged in a three-dimensional virtual reality space beforehand senses an external event based on a change in its field value to generate an event in a VRML scene.

(2) The generated event is transmitted to an external script, which is a program for specifying the behavior of the object based on a routing described as a VRML file.

(3) The external script describes beforehand a method to be called when a particular event is received. The external script, which has received the event transmitted by the routing, executes the processing based on the description and then changes the value of the field of the corresponding node in the VRML scene based on the result of the processing and the description of the routing.

For sensor nodes, the VRML 2.0 defines TouchSensor that causes an event when the pointing device passes over a specified object or the same is clicked by the user, ProximitySensor that causes an event when ViewPoint (of the user) enters a specified region, and TimeSensor that is caused every time a preset time interval elapses, for example.

The following describes the mechanism of Behavior in more detail. As described above, the mechanism of Behavior is implemented by a sensor, an event, a routing, and a script.

The sensor is functionally divided into the following two types:

the type for sensing a user operation; and the type for sensing a system change.

The sensor for sensing a user operation provides a software switch related to an object arranged in a three-dimensional virtual reality space. The sensor for sensing a system change starts a timer preset to a start time. These sensors sense these external events and convert them into events inside VRML.

The event indicates data for transmitting information between associated nodes in VRML. Actually, a change in a field value described in a VRML file is transmitted as an event.

The routing is a mechanism for specifying to which node an event sensed by the sensor capability is to be transmitted. Actually, the routing specifies a path of information transmission by the event.

The script provides an input/output port, performs some computation from an inputted event, and outputs a result of the computation. The script is not restricted to a particular language. In the current stage, the script can be written in Java (registered trademarks of Sun Microsystems, Inc.) and JavaScript noticed in the Internet, C language widely used in ordinary systems, Tcl/Tk and Perl widely used in UNIX, or Visual Basic provided by Microsoft Corporation. Thus, VRML 2.0 does not depend on a particular script language (in the course of defining VRML 2.0 specifications, employment of VRMLScript as particular language specifications was discussed but this idea was eventually discarded).

The following describes the processing means of Behavior with reference to FIG. 1. The processing by Behavior is diagramatically represented as shown in FIG. 1. The following describes flows of processing signals.

(1) Sensor Node

As described above, the sensor node is largely classified into two types; a sensor for sensing a user operation and a sensor for sensing a system change.

The sensor for sensing a user operation has sensor nodes such as TouchSensor and PlaneSensor for sensing a mouse click on a three-dimensional object and passing of a pointing device over a plane of the three-dimensional object. The sensor for sensing a system change has TimeSensor adapted to generate an event when a preset time has been reached.

In the example of FIG. 1, it is assumed that TouchSensor is attached to a sphere. When an user clicks the sphere, this event is sensed by TouchSensor. This event is sensed because the field value of the eventOut field of TouchSensor changes. Generally, one mouse click operation generates two events; namely, the timing of pressing the mouse button and the timing of releasing the mouse button.

Then, this event is routed by the routing description part.

(2) Routing

"Route" as shown in FIG. 2 specifies routing of this event.

When an event caused in the sensor description part is transmitted to the eventOut field of the Route and then to a script node to be described below, the event is passed to the external file, upon which the Behavior capability is executed.

(3) Script Node

This is a node for mediating the interlocking between a VRML file and an external script. This node specifies the language in which the description is made and a file name according to the description format of the script node, and the eventIn field and the eventOut field in order to give and take the event to and from the external script file. Available script files include those written in Java, JavaScript, C language, Tcl/Tk, Perl, and Visual Basic.

In actual processing, the processing is transmitted to the script file in which the routed event is described in the script node and the external script file is executed. The external script file is received through eventIn (event entrance) defined in it and the processing described in that file is executed. When this processing has come to an end, the processing result is returned through eventOut (event exit) to the routing of the VRML file. The VRML file executes this returned result, upon which the series of Behavior processing operations come to an end.

Use of the mechanism of Behavior to be realized by the above-mentioned cooperation between the sensor, the routing, and the script allows the user to dynamically change the external view (shape, attitude, size, color, and so on) or behavioral sequence for example of an object arranged in a three-dimensional virtual space by clicking an object resembling a switch also arranged in this space.

Details of the Behavior mechanism is disclosed in Section 4 "Concept" in the Specifications "The Virtual Reality Modeling Language Version 2.0," ISO/IEC CD 14772, Aug. 4, 1996 which is made public in http://webspac e.sgi.com/moving-worlds/spec/part1/concepts.html and its Japanese version http://www.webcity.co.jp/info/ando h/VRML/vrml2.0/spec-jp/part1/concepts.html. This section describes the key concepts to use of the VRML specifications. These concepts include various general node-related items such as a method of linking a node to a scene graph, a method in which a node generates or receives an event, a method of generating a node type by a prototype, a method in which a node type is added to VRML and then exported to be made available from outside, and a method of incorporating a script to operate as a program into a VRML file.

The following describes a technology in which, by application of the mechanism for realizing the above-mentioned autonomous movement (Behavior) of VRML 2.0, a virtual life object is created in a shared virtual space, growth parameters (external growth or internal growth (personality)) that change according to the generation of an event such as a user operation or passing of a predetermined time are controlled by a server, and a script program for dynamically change one or both of the external view (shape, attitude, size, color, and so on) and the behavioral sequence of the created virtual life object based on the growth parameters transferred from this server is interpreted and executed, thereby displaying the virtual life object according to the growth parameters.

Figure 3:
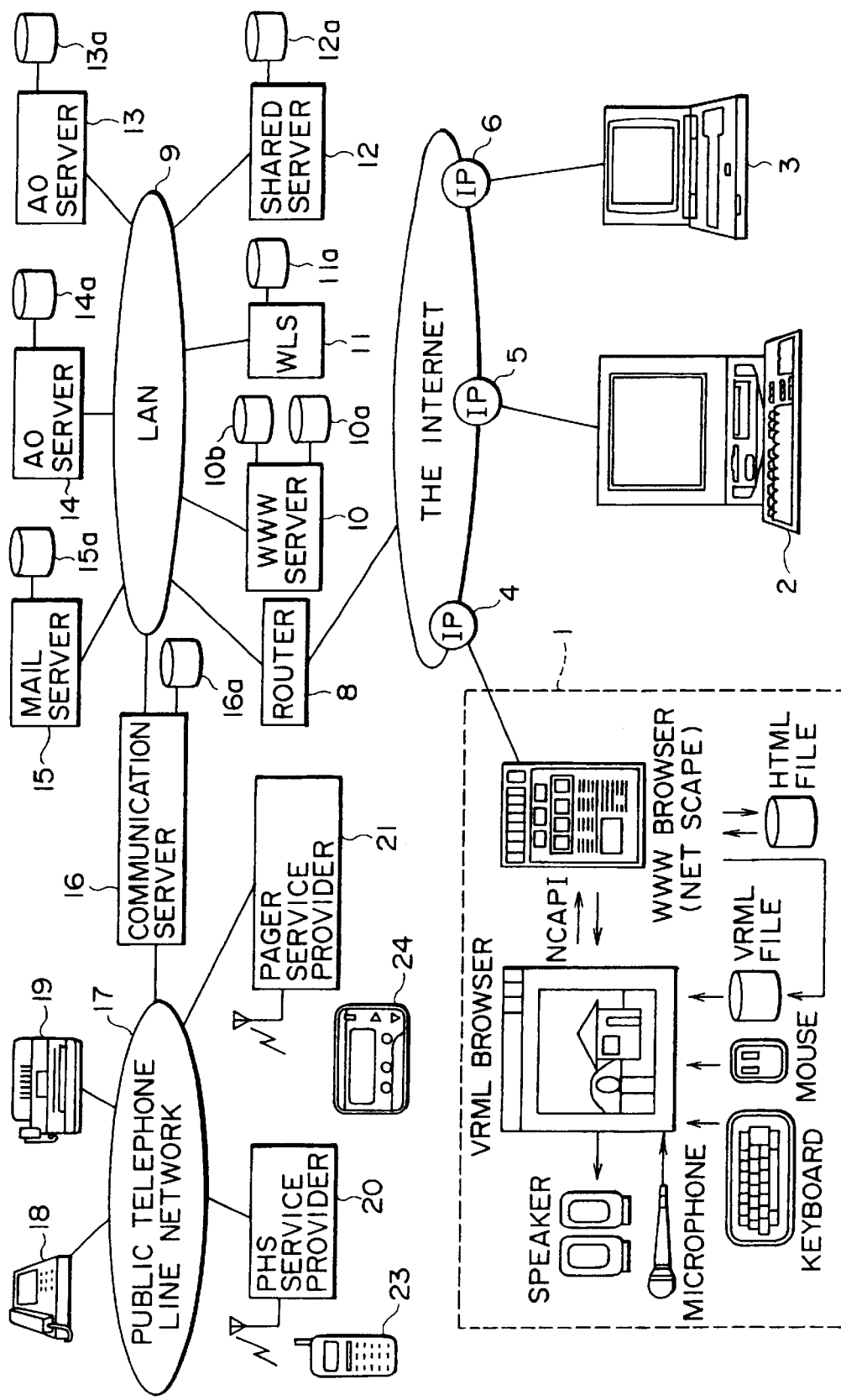
FIG. 3 is a block diagram illustrating an example of a constitution of a shared virtual space providing system associated with the present invention.

FIG. 3 is a schematic diagram illustrating an entire system practiced as one preferred embodiment of the present invention.

In FIG. 3, reference numerals 1, 2, and 3 denote client PCs (Personal Computers) on which a VRML browser and a WWW browser are installed and operating. These PCs are connected to the Internet 7 through IPs (Internet Service Provider) 4, 5, and 6.

A LAN (Local Area Network) connected to the Internet 7 through a router 8 is connected to a WWW server 10, a WLS (World Location Server) 11, a shared server 12, AO (Application Object) servers 13 and 14, a mail server 15, and a communication server 16. The WWW server is provided with hard disk (HDD) 10a and 10b, the WLS server 11 with a hard disk 11a, the shared server 12 with a hard disk 12a, the AO server 13 with a hard disk 13a, the AO server 14 with a hard disk 14a, the mail server 15 with a hard disk 15a, and the communication server 16 with a hard disk 16a.

The communication server 16 is connected to a telephone 18 and a facsimile 19 through a public telephone network 17, to a PHS (Personal Handyphone System) terminal 23 through a PHS service provider 20 in a wireless manner, and to a paging terminal 24 through a paging service provider 21 in a wireless manner.

Figure 4:
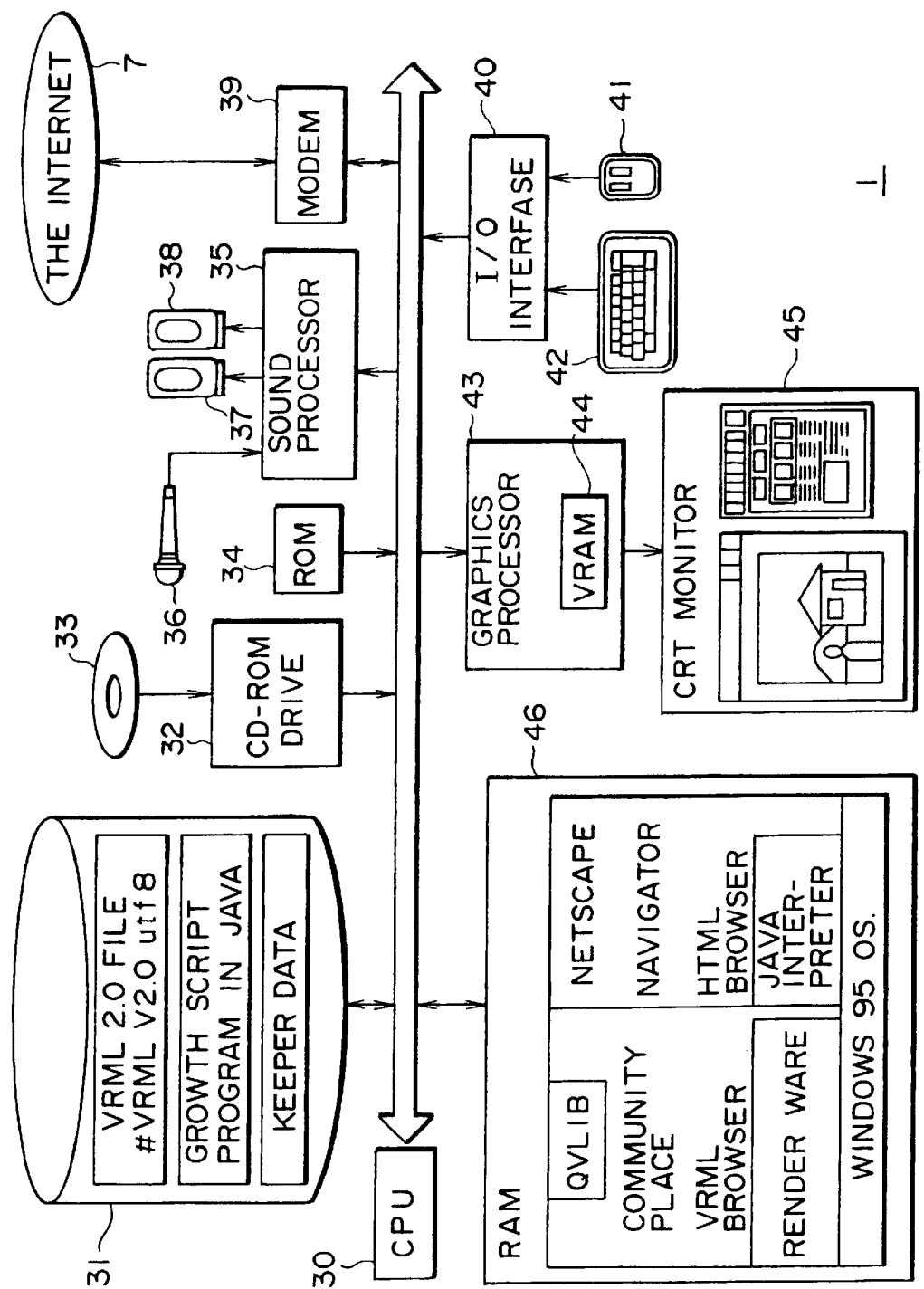
FIG. 4 is a block diagram illustrating an example of a constitution of the client PC 1 shown in FIG. 1.

FIG. 4 is a schematic block diagram illustrating a hardware constitution of the client PC 1.

In FIG. 4, reference numeral 30 denotes a CPU (Central Processing Unit) for controlling this client PC. Reference numeral 31 denotes a hard disk storing VRML contents composed of a VRML 2.0 file and a growth script program for a shared virtual life by Java (registered trademark of Sun Microsystems, Inc.), and data about the keeper of the virtual creature. Reference numeral 32 denotes a CD-ROM drive for reading VRML contents stored in a CD-ROM disc 33. Reference numeral 34 denotes a ROM storing a BIOS (Basic Input/Output System) and so on. Reference numeral 35 denotes a sound processor connected to a microphone 36 and left and right speakers 37 and 38. Reference numeral 39 denotes a MODEM through which this client PC is connected to the Internet. Reference numeral 40 denotes an I/O (Input/Output) interface connected to a mouse 41 and a keyboard 42. Reference numeral 43 denotes a graphics processor incorporating VRAM (Video RAM) 44. Reference numeral 45 denotes a CRT monitor. Reference numeral 46 denotes a RAM.

In the RAM 46, Netscape Navigator, which is a WWW browser operating on Windows 95 (registered trademark of Microsoft Corporation), the Java interpreter, and Community Place Browser, which is a VRML 2.0 browser developed by Sony Corporation, are read at run time and are ready for execution by the CPU 30.

The VRML 2.0 browser is installed with QvLib, which is a VRML syntax interpreting library (parser) developed by Silicon Graphics, Inc. in U.S.A. and offered without charge, RenderWare, which is a software renderer developed by Criterion Software Ltd. in England, and so on or other parser and renderer having equivalent capabilities.

As shown in FIG. 3, Community Place Browser transfers data of various types with Netscape Navigator, a WWW browser, based on NCAPI (Netscape Client Application Programming Interface) (registered trademark).

Receiving an HTML file and VRML content (including a VRML file and a script program written in Java) from the WWW server 10, Netscape Navigator stores them in the local HDD (Hard Disk Drive) 31. Netscape Navigator processes the HTML file to display text and images on the CRT monitor. On the other hand, Community Place Browser processes the VRML file to display a three-dimensional virtual space on the CRT monitor and changes the behavior of the object in the three-dimensional virtual space according to the result of processing of the script program by the Java interpreter.

It should be noted that the other client PCs 2 and 3 have generally the same constitutions, not shown, as that of the PC 1 described above.

The following describes the operation of the above-mentioned preferred embodiment.

First, a sequence spanning from actually downloading the VRML content through the Internet to providing a multi-user environment in which one virtual space is shared by plural users is described with reference to FIGS. 5 through 7.

Figure 5:
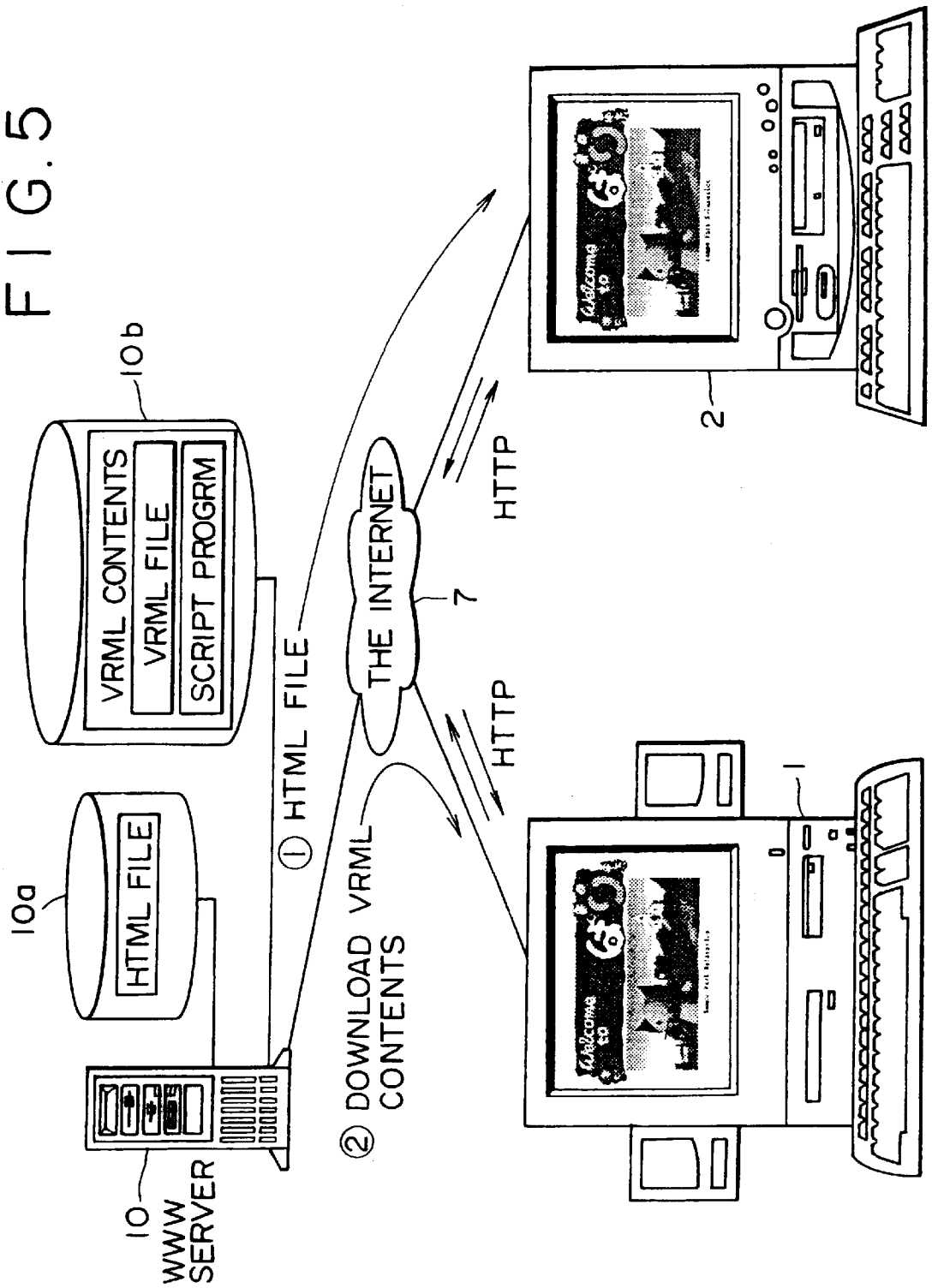
FIG. 5 shows display photographs for describing an operation of the system shown in FIG. 3.

Referring to FIG. 5, the home page of the Web site that provides the VRML content is browsed by use of the WWW browser as shown in (1). In this example, home page http://pc.sony.co.jp/sapari/ is browsed. Next, as shown in (2), the users of the client PC 1 and the client PC 2 download the VRML content composed of the VRML 2.0 file and the script program (the growth script program written in Java) for realizing an autonomous movement (Behavior) in the VRML space.

Obviously, the VRML content provided in the CD-ROM disc 33 may be read by the CD-ROM drive 32.

Figure 6:
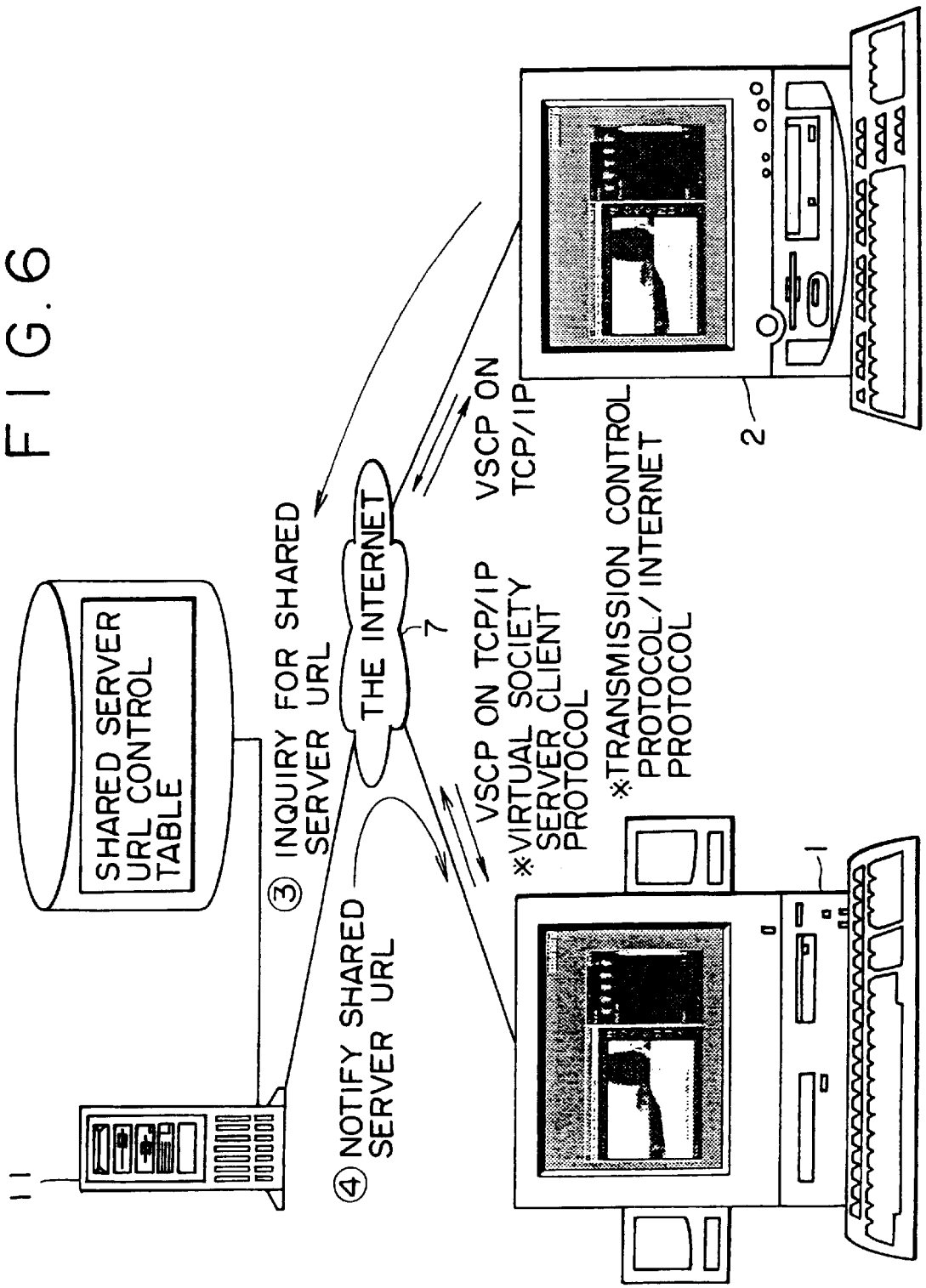
FIG. 6 shows display photographs for describing another operation of the system shown in FIG. 3.

Then, as shown in FIG. 6, in the client PC 1 and the client PC 2, the VRML 2.0 file downloaded and stored in the local HDD 31 is interpreted and executed by Community Place Browser, which is a VRML 2.0 browser. Next, as shown in (3), the client PCs ask the WLS 11 for the URL of the shared server 12 based on VSCP (Virtual Society Server Client Protocol). In response, as shown in (4), the WLS 11 references the shared server URL control table stored in the HDD 11a and sends the URL of the shared server 12 to the client PC 1 and the client PC 2.

Figure 7:
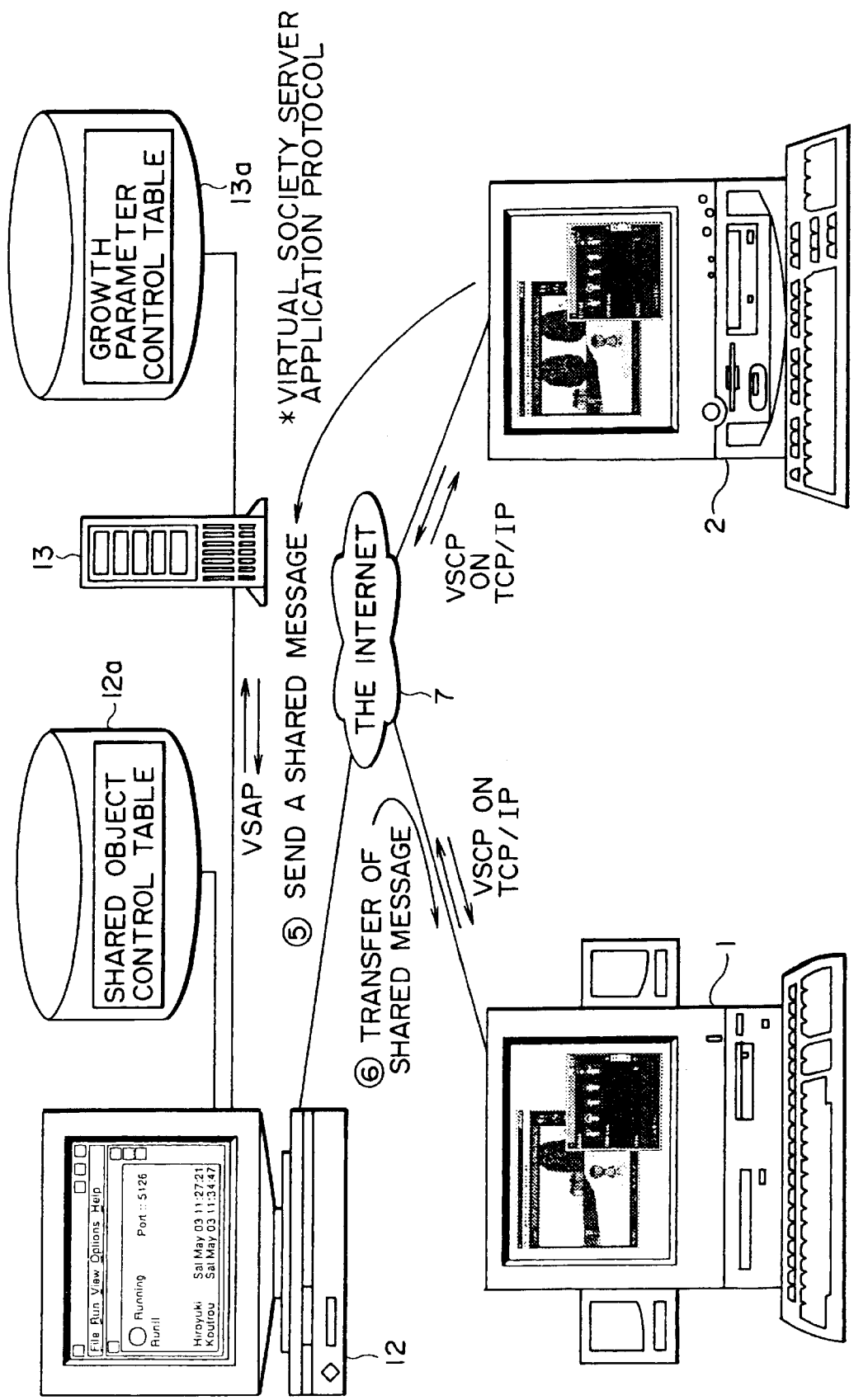
FIG. 7 shows display photographs for describing another operation of the system shown in FIG. 3.

Using this URL, the client PC 1 and the client PC 2 are connected to the shared server 12 as shown in FIG. 7. As a result, as shown in (5), shared messages associated with the position and movement of the shared 3D object are transmitted through this shared server 12. These messages are transferred as shown in (6) to realize the multi-user environment.

For detailed description of the procedure of the above-mentioned connection, refer to Japanese Patent Laid-open No. Hei 9-81781 corresponding to U.S. patent application Ser. No. 678,340.

The following describes the AO server 13 that controls the behavior of a virtual life object existing in the shared virtual space. The AO server 13 transfers data associated with the virtual life object with the shared server 12 based on VSAP (Virtual Society Server Application Protocol). The HDD 13a of the OA server stores a growth parameter control table for the virtual life object as shown in FIG. 7.

As shown in FIG. 8, the data associated with the virtual life object in the growth parameter control table are largely classified into virtual life data and keeper data.

The virtual life data includes a 3D object ID for uniquely identify a 3D object in one shared virtual space, three-dimensional coordinate values representing the virtual life object in the shared virtual space, a type of a creature such as a monkey or a cat selected by the keeper, the gender of the creature, its nickname given by the keeper, a date initialized by the keeper, namely the birth date of the virtual life object, a world name (a world name of domicile of origin) given to the virtual space in which the virtual life object was born, and growth parameters of the virtual life object.

The growth parameters are largely classified into physical parameters for specifying the external growth of the virtual life and mental parameters for specifying the internal growth of the avatar reflecting its character.

The physical parameters are composed of height (in centimeters), weight (in kilograms), physique index, appetite index, health index, and remaining life time (in hours).

The mental parameters include intelligence quotient, language capability index, sociability index, independence index, activity index, and mood index.

These parameters are sequentially updated to values computed by a predetermined growth parameter computing equation based on a timer event caused when certain time has passed after the birth date initialized by the keeper, and an access event and an operation event caused by a call message and an operation message from the client PC.

Figure 9:
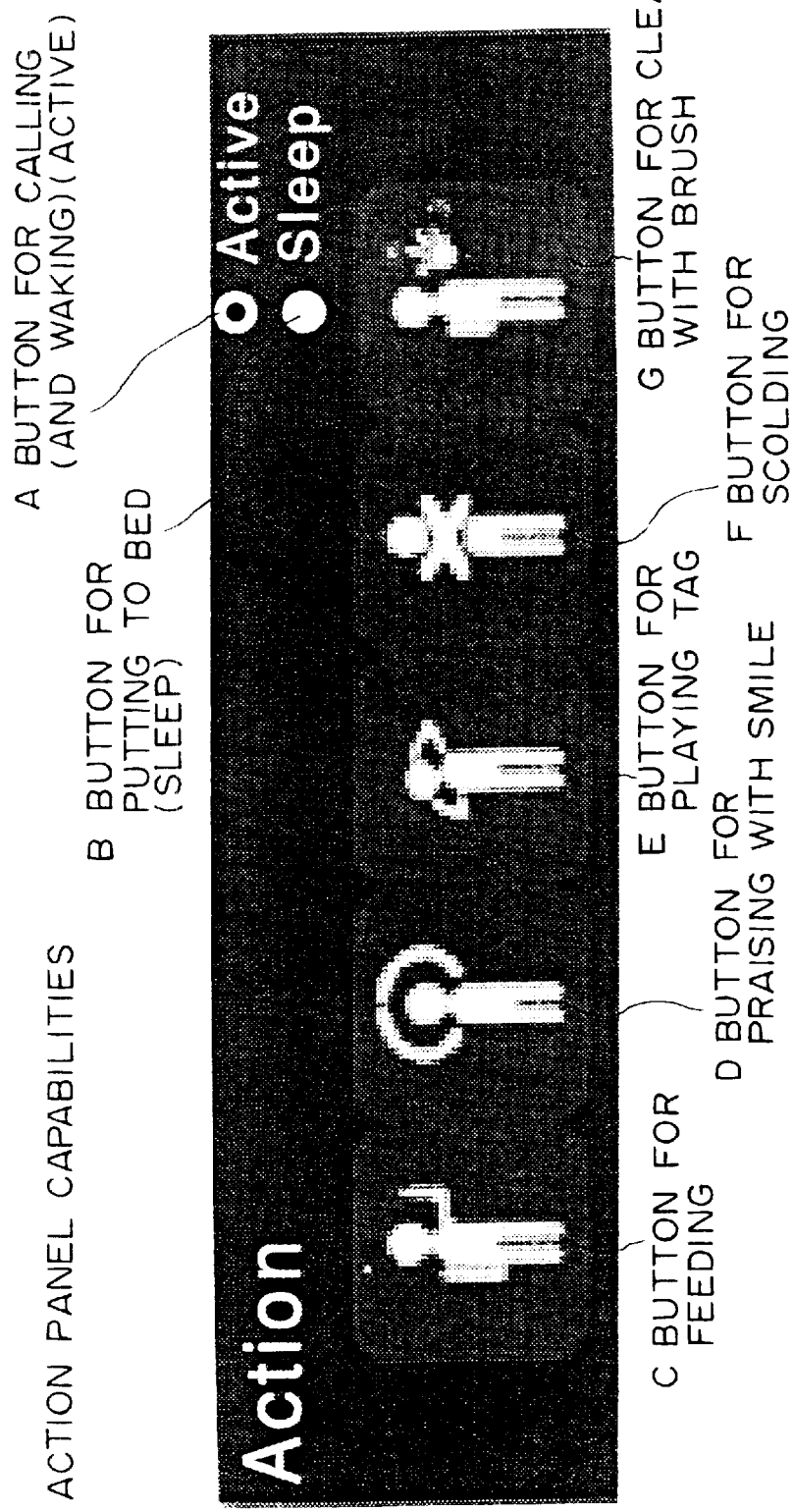
FIG. 9 shows a photograph for describing an action panel.

FIG. 9 shows capabilities of an action panel displayed beside the main window of the VRML browser on the CRT monitor screen of the client PC 1.

In FIG. 9, "A" denotes a calling button represented as "Active." This button is clicked to call the virtual pet or wake up the sleeping virtual pet.

"B" denotes a button represented as "Sleep" for putting the virtual pet to bed.

"C" denotes a feeding button. This button is clicked to feed the virtual pet.

"D" denotes a praise button. This button is clicked to praise the virtual pet by smiling at it.

"E" denotes of a play button. This button is clicked to play tag, in which the keeper chases the virtual pet until the same is blocked by a wall and cannot be escaped therefrom.

"F" denotes a scold button. This button is clicked to scold the virtual pet for discipline.

"G" denotes a groom button. This button is clicked to groom the virtual pet by brushing.

Figure 10:
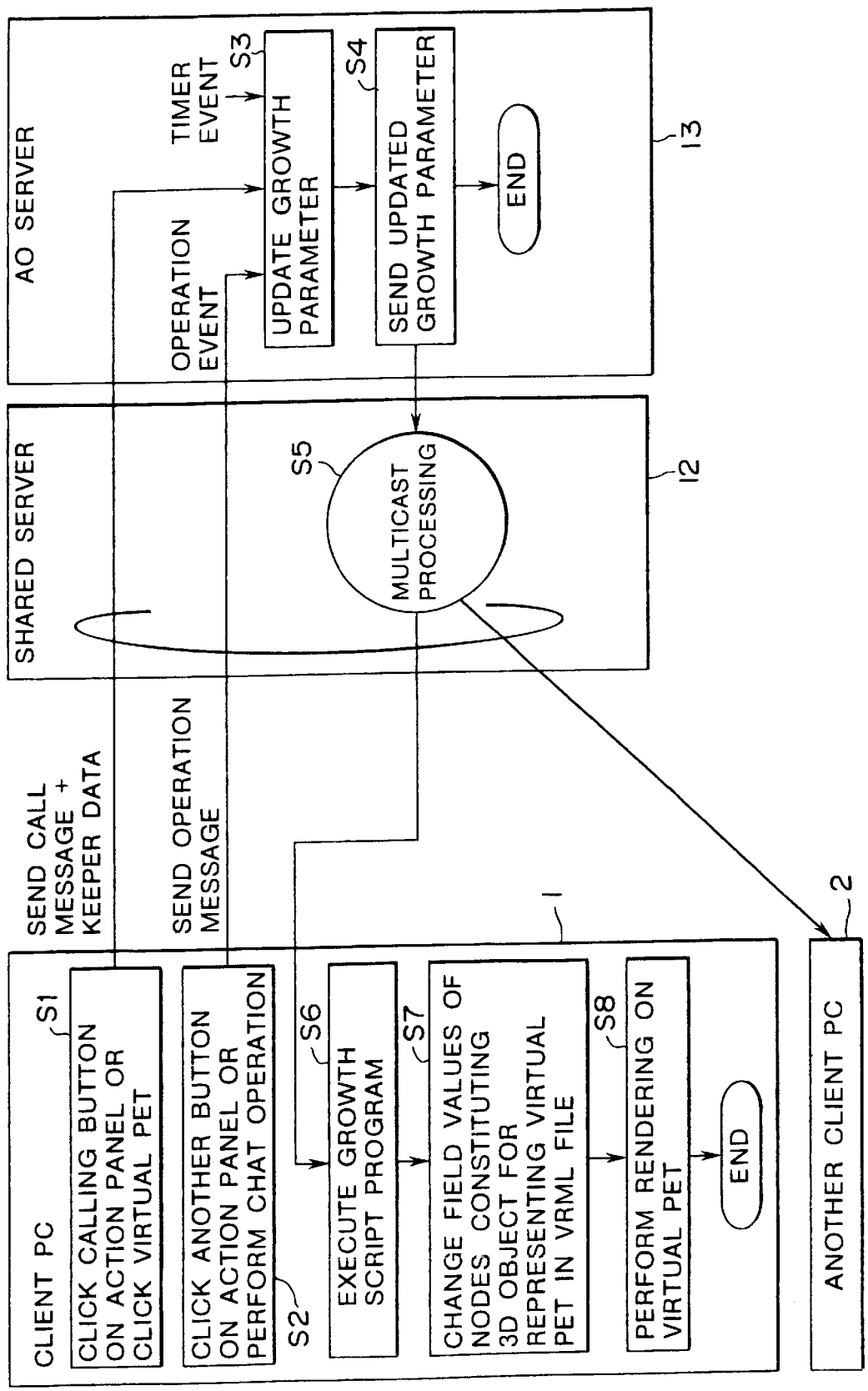
FIG. 10 is a diagram illustrating passing of a growth parameter.

As shown in FIG. 10 for example, when the call button A is clicked (the action panel is operated) on the own client PC 1 and a resultant call message is sent to the AO server 13 through the shared server 12 (step S1), growth parameter update processing is performed on the growth parameter control table based on that access event (step S3). Based on this access event, the appetite index, the health index, and the mood index are each incremented by 0.1 point from 1/10 to 10/10.

If the feeding button C is clicked for example and a resultant message is sent to the AO server 13 (step S2), the weight of the growth parameter increase every time the operation event occurs, along which the physique index is incremented by 0.1 point from 1/10 to 10/10 (step S3).

Then, when the timer event occurs as a result of passing of a predetermined time, the weight, one of the growth parameters, decreases, decrementing the physique index by 0.1 point (step S3).

For example, the growth parameters including this physique index are transferred (step S4) to the client PC 1 of the original keeper and another client PC 2 sharing the virtual space by multicast processing (step S5) of the shared server 12 every time the growth parameters are updated.

The client PC 1 executes the growth script program described with a processing procedure for controlling the autonomous behavior resulted from the virtual pet growth based on the growth parameters (step S6), changes the field values of the nodes constituting the 3D object for representing the virtual pet in the VRML file (step S7), performs rendering on the virtual pet on which the changed field values are reflected (step S8), and displays the rendered virtual pet on the main window of the VRML browser on the CRT monitor screen of the client PC 1.

The same processing performed by the client PC 1 is also performed on the other client PC 2 sharing the virtual space. Consequently, rendering is performed on the appearance of the virtual pet on which the field value changed along the growth of the virtual pet is reflected, and the rendered virtual pet is also displayed on the main window of the VRML browser on the CRT monitor of the other client PC 2.

Figure 11:
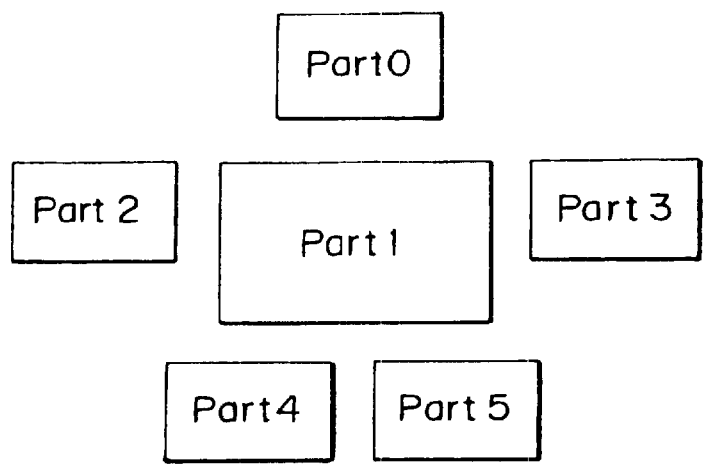
FIG. 11 is a diagram for describing virtual life object nodes constituting a 3D object.
Figure 12:
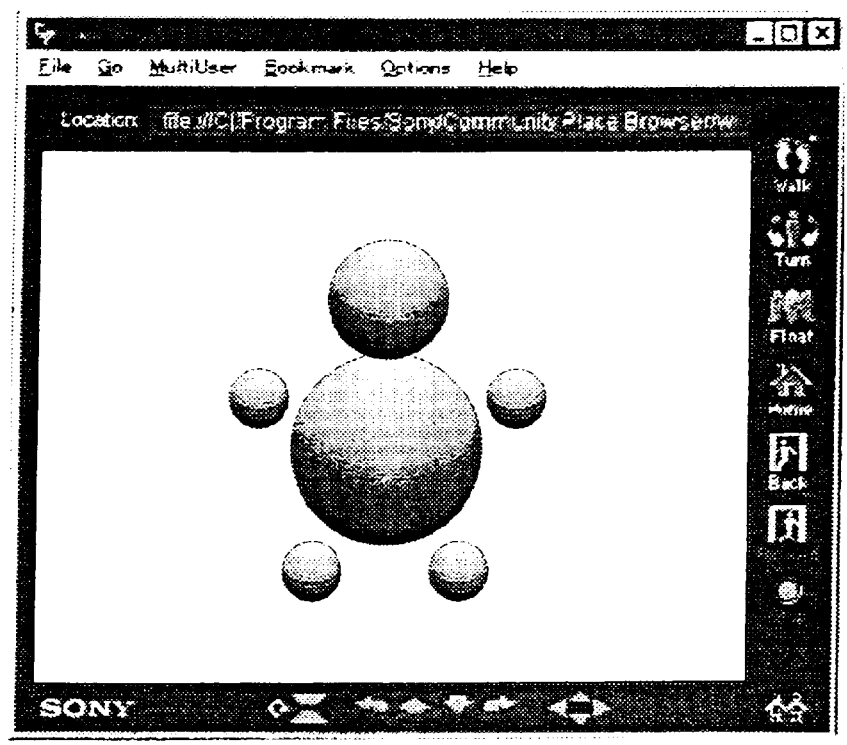
FIG. 12 shows a display photograph indicative of a display example corresponding to the nodes shown in FIG. 11.

FIGS. 11 shows a relationship between part 0 through part 5 corresponding to the nodes constituting a 3D object for representing a virtual pet in the VRML file. FIG. 12 shows an example of displaying these parts. Part 0 corresponds to the head of the virtual pet, part 1 to its body, part 2 and part 3 to its right and left arms, and part 4 and part 5 to its right and left legs.

Changing the field values of the nodes corresponding to these parts 0 through 5 can dynamically change the external view (shape, attitude (orientation), size, color, and so on) and the behavioral sequence of each part of the virtual pet. These are all realized by the processing of the growth script program based on the growth parameters. Namely, these are realized by use of the mechanism of Behavior to be realized by the cooperative operation between the sensor, the routing, and the script defined in VRML 2.0.

Therefore, unlike the conventional method of displaying images of a virtual creature of portable electronic pet, it is unnecessary to store the bit-map images representing each growth process of the character of virtual creature in the ROM beforehand. Namely, use of the mechanism of Behavior can continuously and dynamically change the physique and behavior of a virtual pet according to its growth process for example.

Figure 13:
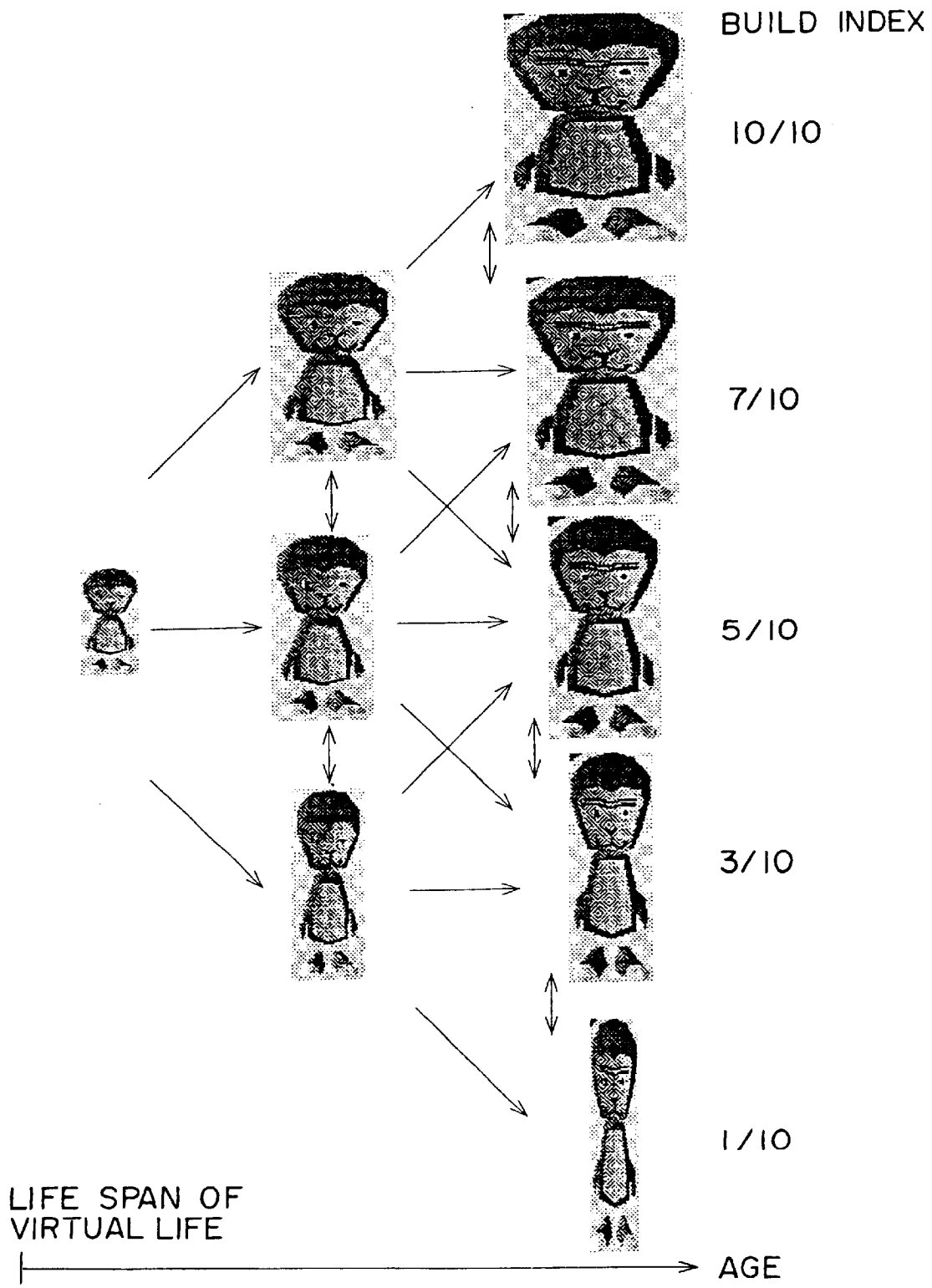
FIG. 13 is a diagram for describing virtual life object physique index.

FIG. 13 is a conceptual diagram in which the physique of a virtual pet is dynamically changed as the virtual pet grows and its physique index changes. As the virtual pet grows in age, its face becomes that of an adult and its physique becomes larger. If the physique index is small, the avatar becomes thin; if it is large, the avatar becomes thick.

FIG. 14 is a conceptual diagram in which the countenance of the virtual pet is dynamically changed as its mood index changes. When the mood index is high, the face of the virtual pet smiles; when it is low, an angry expression appears on the face.

Figure 15:
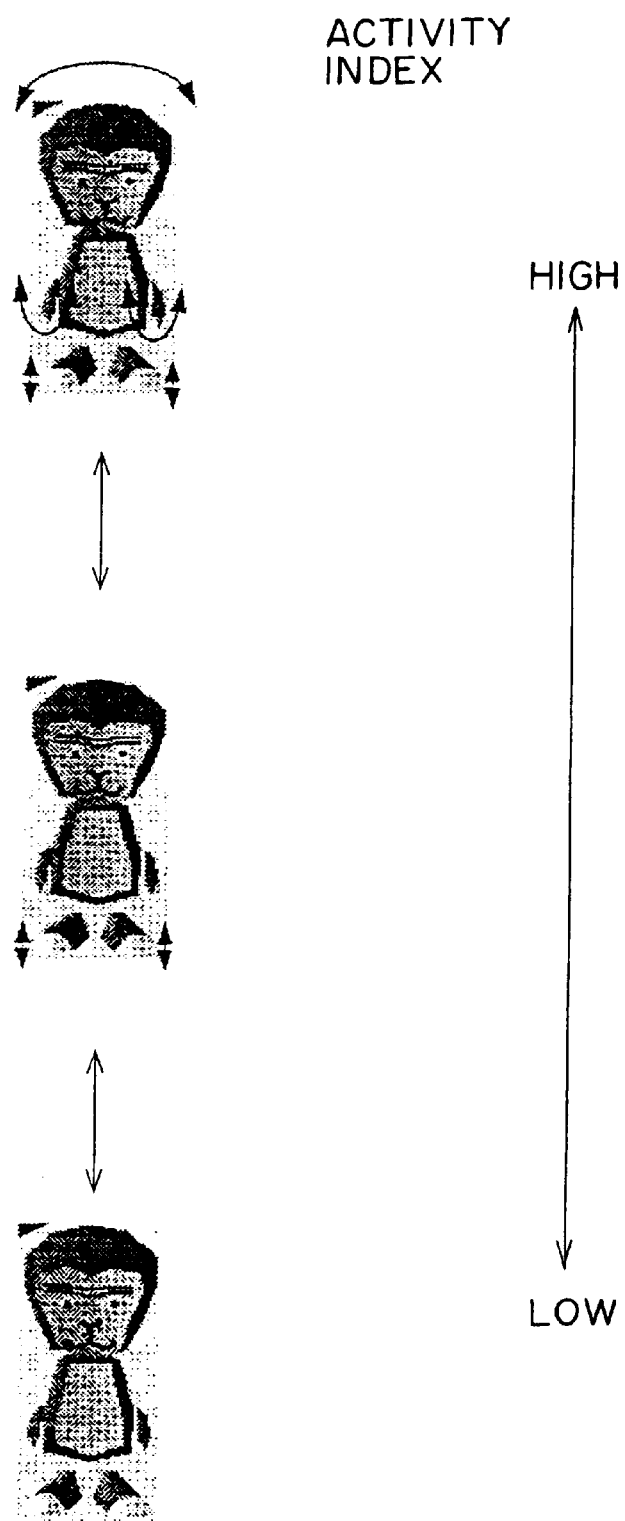
FIG. 15 is a diagram for describing virtual life object activity index.

FIG. 15 is a conceptual diagram in which the behavioral sequence of each part of the virtual pet is dynamically changed as the activity index of the virtual pet changes. When the activity index is low, only a small movement such as bending of knees; when it high, the virtual pet can wave its arms or shake its head for example.

Figure 16:
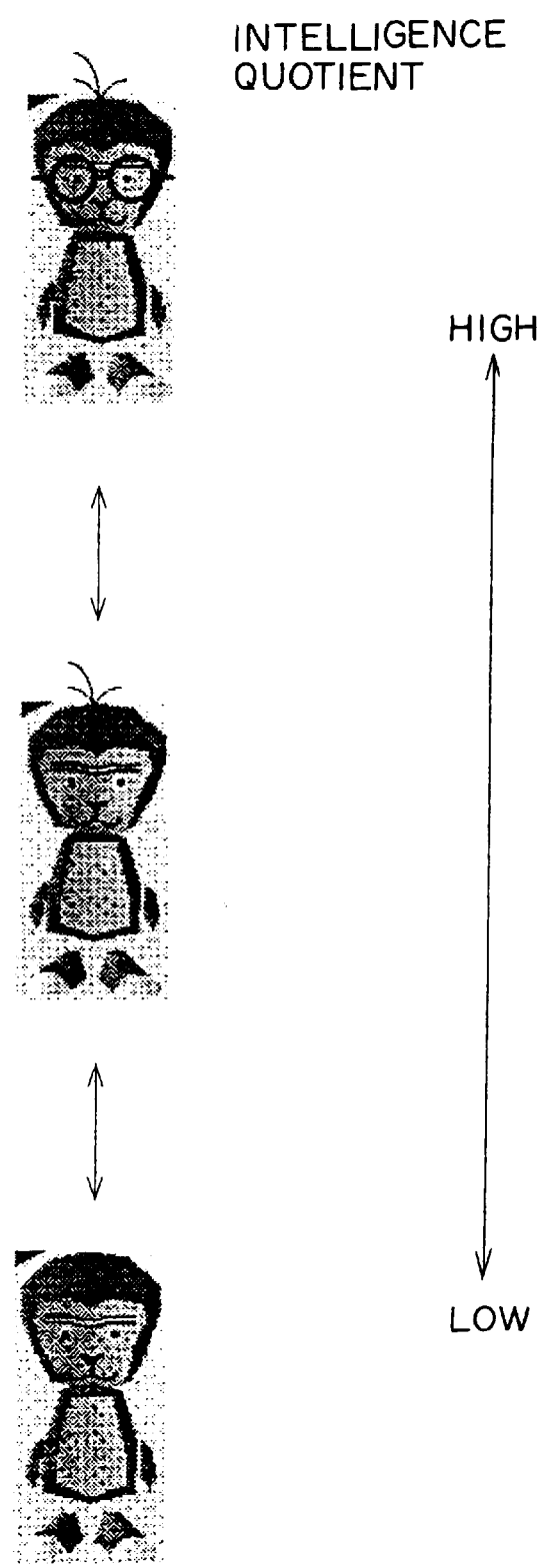
FIG. 16 is a diagram for describing virtual life object intelligent quotient.

FIG. 16 is a conceptual diagram in which hair is added to the virtual pet or glasses are put on it as the intelligence quotient of the virtual pet changes.

The intelligence quotient, one of the growth parameters, is incremented by 0.1 point based on the access event caused by the operation of the calling button A shown in FIG. 9, thereby changing the appearance of the virtual pet as shown in FIG. 16.

The language index is incremented by 0.1 point according to the age of the virtual pet based on the access event caused by the operation of the call button A shown in FIG. 9 or the timer event, thereby changing the style of text in chat sentence editing processing. For example, chat of a virtual pet having a small point is performed using hiragana or katakana Japanese syllabary and a chat of a virtual pet having a large point is performed using text including kanji Chinese characters.

The sociability index is incremented or decremented by 0.1 point according to the frequency of chat with the keeper. If the frequency is high, sociability increases; if it is low, sociability decreases. A virtual pet having a sociable and positive character takes on good attitude and countenance. Conversely, a virtual pet having an introvert and negative character takes on poor attitude and countenance.

The independence index is incremented by 0.1 point as a virtual pet ages based on timer event, gradually becoming independent of the keeper, rejecting commands of the keeper for example.

The activity index is determined based on the age, appetite index, and health index, affecting the behavior of a virtual pet as shown in FIG. 15. Also, the activity index is incremented by 0.1 point based on the event caused by operating the play button E shown in FIG. 9, affecting the behavior of the virtual pet such as gradually quickening getaway. The weight of the virtual pet is decreased to decrement its physique index, dynamically changing its appearance as shown in FIG. 13.

The mood index is determined by the access event caused by operating the call button A shown in FIG. 9 and the access frequency based on timer event, thereby affecting the countenance of a virtual pet as shown in FIG. 14.

On the other than, the keeper data in the growth parameter control table is composed of the name of the keeper, a means (or method) for making contact with the keeper, and the address of the contact.

If the contacting means is 0, contact to the keeper is performed by a message statement through electronic mailing via the Internet 7. If the contacting means is 1, contact to the keeper is performed by converting text data of a message statement into a voice by an automatic reading tool on the communication server 16 and inputting the voice into the analog telephone 18. If the contacting means is 2, contact to the keeper is performed by a message statement to the PHS terminal 23 by use of an electronic mail service based on the data transmission protocol of PIAFS (PHS Internet Access Forum Standard). If the contacting means is 3, contact to the keeper is performed by a written document to the facsimile 19. If the contacting means is 4, contact to the keeper is performed by a message statement to the pager terminal 24.

The keeper data as described above is controlled to realize the capability of contacting the keeper by use of the existing communication infrastructure to be describe later and the capability of simplified operation of a virtual pet by use of the existing communication infrastructure.

The above-mentioned system is summarized as follows. Namely, the growth parameter (indicative of outer growth or inner growth (personality)) of a virtual life object existing in a shared virtual space is controlled by the AO server 13, this growth parameter changing with occurrence of a predetermined event (an event caused by a user operation or passing of predetermined time). Based on the growth parameter transferred from the AO server 13, the script for dynamically changing one or both of the appearance (shape, attitude, size, or color) and the behavioral sequence of the virtual life object is interpreted to display the virtual life object according to the growth parameter on the client PCs 1 and 2.

The AO server 13 for controlling the autonomous behavior of a virtual life object existing in a shared virtual space is provided with a control table for controlling growth parameters for the virtual life object that change with occurrence of a predetermined event (an event caused by a user operation or passing of a predetermined time). A growth parameter read from the control table upon request from a client or occurrence of a predetermined demand is sent to one or both of the requesting client and another client.

As described above, the growth parameter is a value indicative of the degree of external growth to be calculated based on the occurrence of a predetermined event (an event caused by a user operation or passing of a predetermined time) from the birth of a virtual life object. Therefore, the outer growth parameter defines the outer change of a virtual life creature or a virtual pet (AO) according to the age from baby to grown-up to aged.

The growth parameter is also a value indicative of the degree of inner growth (character) to be calculated based the occurrence of a predetermined event (a user operation or passing of a predetermined time) for a virtual life object. For example, a virtual life object having a sociable and positive character takes on good attitude and countenance. Conversely, a virtual life object having a dark and negative character takes on bad attitude and countenance. Thus, the change in the character of a virtual life creature or a virtual pet (AO) is specified by the inner growth parameter.

For the inner growth parameter, a different value is calculated according to the type of an event for a virtual life object, updating the degree of the inner growth. If the character of a virtual pet for example is controlled by the AO server 13, 0.1 point is added to a predetermined index of the growth parameter according to the type of a message sent from each client; for example, every time the virtual pet is talked to in chat. Every time, the virtual pet is praised by pressing of the praise button D, 0.2 point is added. Every time the virtual pet is scolded by pressing of the scold button F, 0.2 point is subtracted from the predetermined index. Thus, the calculation is performed based on predetermined arithmetic equations.

The AO server for controlling the autonomous behavior of a virtual life object in a shared virtual space is provided with a growth parameter control table indicative of the degree of growth of each virtual life object. This control table holds the birth date of each virtual life object. Based on the elapsed time starting from this birth date, the growth parameter according to the age of each virtual life object is calculated. The control table is updated by the newly calculated growth parameter.

The autonomous behaviors of plural virtual life objects in a shared virtual space are independently controlled by the AO server 13 (the single AO server 13 may control plural growth parameter control tables or the AO server 13 and the AO server 14 may control the plural control tables separately). Thus, the growth parameter control tables indicative of the growth degrees of different virtual life objects may be provided separately to control the growth parameters of the different virtual life objects independently.

In addition, various applications such as described below for example are possible.

For example, the AO server 13 for controlling the autonomous behavior of a virtual life object in a shared virtual space may be provided with a control table for controlling the ID (a nickname for example of the virtual life object set by user) of a client who accessed the virtual life object (the control items of this control table may be included in the growth parameter control table or this control table may be provided independently). Based on this control table, an event indicative of an intimacy emotional expression may be started according to the access by the client having this ID. Thus, holding the degree of intimacy (access count and contents) on the AO server 13 can realize a pet (virtual life) object that approaches its keeper when the keeper has entered the world (the shared virtual space).

The ID of a client who has set or reset a virtual life object may be stored in the growth parameter control table as the keeper of this virtual life object. Updating of this ID is disabled until the life of the virtual life object expires. At the time of the expiration, this ID may be deleted. This can realize a virtual pet that is loyal to its keeper who gave birth to it (namely set it in the shared virtual space). Further, when the life of a virtual life object expires (namely, it is reset), a child of this virtual life object may be automatically generated and the ID of the keeper of its parent may be set to this child. This makes the child pet be also loyal to the keeper of its ancestor.

The AO server 13 may be provided with a history control table for controlling the history of a client who has set or reset a virtual life object. The client higher in access frequency than other clients can start a behavioral sequence indicative of more intimate emotional expression. As the access frequency lowers, the degree of intimacy lowers, thereby realizing a whimsical pet of which degree of intimacy changes with access frequency.

If the movement of a virtual life object is controlled according to the position of client in a shared virtual space, the virtual life object immediately appears just in front of the client (keeper) when the client enters the shared virtual space, thereby realizing the virtual life object that always follows its keeper about.

An event in a shared virtual space (for example, an experience of being fed by another client) may be reported by the virtual life object to the client through a text-based chat window, thereby realizing an intimacy emotional expression.

Experience of an event in a shared virtual space may be reported from the virtual life object to the client through a voice chat to provide an intimacy emotional expression. Alternatively, this report may be made through a voice chat capability as an analog voice message based on text-to-voice conversion supported by text reading software. Alternatively still, several types of voice messages may be sampled and compressed to be stored as digital voice compressed data in the hard disk (of the AO server 13 or the client PC 1). Then, an optimum voice message is selectively read from the hard disk, decompressed, and reported to the client as an analog voice message through the voice chat capability. For the conversion between text and voice, the technology disclosed in Japanese Patent Laid-open No. Hei 7-105848 is available.

The following describes the capability of notification to the client based on an existing communication infrastructure and the capability of simplifying the operation of a virtual pet based on an existing communication infrastructure.

For example, if the appetite index of a virtual life object increases or its remaining life time goes below a predetermined value, the virtual life object (the AO server 13) notifies, through the mail server 15 or the communication server 16, its keeper at the keeper's address of contact of this change by use of the contacting means (FIG. 8) previously set to the growth parameter control table. If the keeper cannot immediately access the personal computer under situations that the keeper is away from the personal computer or the personal computer itself is malfunctioning for example, the keeper can later check requests of the virtual pet and make communication with it.

On the other hand, a service provider for providing services for virtual pet breeding such as described so far can evoke a motivation of a kind that the user must soon access the virtual pet. This provides a by-product that the service provider can ensure regular access, contributing to its stable management.

The following describes a particular example for realizing the above-mentioned notification capability based on an existing communication infrastructure.

The communication server 16, one of the servers for controlling the autonomous behavior of a virtual life object in a shared virtual space, is provided with a communication control table (a table corresponding to the keeper data in the growth parameter control table shown in FIG. 8) for controlling the type of a message notification means (or a message notification method) for making notification to the user, or the keeper of each virtual life object and controlling the address of contact of the keeper. As the state of the virtual life object changes (the communication server 16 is notified of this change by the AO server 13), the message is sent to the address of contact by use of the communication means registered in the communication control table. This allows actual communication from the shared virtual world to the real world.

The ID for identifying each user, or the keeper of each virtual life object and the history access by the user having this ID are controlled by this communication control table. Based on the access history, a message "I miss you" for example may be sent to a user who has not accessed his or her virtual life object for over a certain period.

Further, based on the access history, an optimum message statement may be selected from among plural message statements. The day after the day on which access was made by the user, a message "Thank you for playing with me. Let's play again" for example may be sent from the virtual life object to its keeper. If no access has been made for over one week for example, a message "Are you busy these days? Please come to play with me sometimes" for example is sent.

A transition in the state of a virtual life object is sensed based on the updated content of the growth parameter control table, an optimum message statement is selected from among plural message statements, and the selected message is sent. For example, the day after the day on which the virtual life object was fed much, a message "I'm still full" for example is sent. If no access has been made for one week for example, a message "I'm starving to death" for example is sent. In a scenario in which a virtual life object is aged one year in one week, its birthday comes every week and a message "I have become 10 years old today. Please look at grown-up me" for example is sent. If the allocated remaining life time is nearly expiring, a message "I have to go somewhere far away soon. Please be with me when I die" for example is sent.

The mail server 15 may be provided with a part of the communication control table associated with electronic mail to send a text-based message to the keeper of each virtual life object at his or her electronic mail address (including his or her ID) by the communication control table of the mail server 15.

In addition to an electronic mail transmitted through the Internet 7, a message may be sent from the communication server 16 through the public telephone network 17 to the PHS terminal 23 based on PIAFS (PHS Internet Access Forum Standard) or (DATA32 for example or to a pager (the pager terminal 24) to be displayed on the LCD of the PHS or the pager.

Alternatively, the telephone number (including the ID) of the user of each virtual life object may be controlled by the communication control table to automatically calling the user at his or her registered telephone number from the communication server 16, thereby sending a voice message. In this case, this notification may be made as an analog voice message based on text-to-voice conversion supported by text reading software through the ordinary telephone 8 or a mobile telephone (the PHS terminal 23). Alternatively, several types of voice messages may be sampled and compressed to be stored as digital voice compressed data in the hard disk (of the AO server 13 or the client PC 1). Then, an optimum voice message is selectively read from the hard disk, decompressed, and reported to the client as an analog voice message.

The facsimile number (including the ID) of the user of each virtual life object may be controlled by the communication control table to automatically call the user at this facsimile number, thereby sending a message to the facsimile 19.

Further, by use of a terminal such as the telephone 18 that has received the above-mentioned message from the virtual pet, two-way communication may be made between the keeper and its virtual pet from this terminal by a simplified operation.

The following describes a particular example of realizing the capability of performing a simplified operation on a virtual pet by use of an existing communication infrastructure.

For example, the shared server 12 can interpret an operation command returned with the ID (caller ID) of the user through the PHS terminal 23 or the telephone 18, recognize the operation command as a message to the corresponding virtual life object, send the message to the AO server 13, and reflect the content of the message onto the state transition (updating of a growth parameter) of the virtual life object.

For the above-mentioned returned operation command, a DTMF (Dual-Tone Multi Frequency) signal that is generated when a push button on the telephone 18 is pressed for example may be used.

In addition, by use of Web-On-Call (registered trademark) voice browser by NetPhonic Communications Inc. (http://www.netphonic.com/) for example, various notifications to a virtual pet may be made. This voice browser allows access to servers from the ordinary telephone 18 by voice. This voice browser has a text reading capability, so that a mail from a virtual pet can be heard in voice. Moreover, this voice browser can also send text by facsimile or electronic mail.

It should be noted that the shared server 12, the AO servers 13 and 14, the mail server 15, and the communication server 16 execute various capabilities in a shared manner, thereby realizing a service for providing a shared virtual space to client PCs as a whole system.

The following describes a chat capability to be executed in this shared virtual space. Chat is classified into public chat and personal chat. In public chat, conversation uttered by one client (user) at a predetermined location in the shared virtual space is transmitted to other nearby clients (users) in the shared virtual space.

In personal chat, conversation is made only with a specified party. This specification is performed by clicking the mouse button on a desired virtual life object while pressing the shift key of the keyboard 42 for example. When the other party of chat is specified, chat made by the client who made that specification is directed only to the specified party.

In voice chat, contents of chat are transmitted in a voice signal; in text chat, they are transmitted in text. In voice chat, voice data captured by the microphone 36 is transmitted to the clients (users) nearby or specified virtual life objects to be sounded from the speakers 37 and 38 of the PCs of these clients.

In text chat, text entered by from the keyboard 42 is transmitted also to the clients (users) of nearby or specified virtual life objects to be displayed on the CRT monitor 45 of the client PCs.

The user can select between voice chat and text chat as required.

Figure 17:
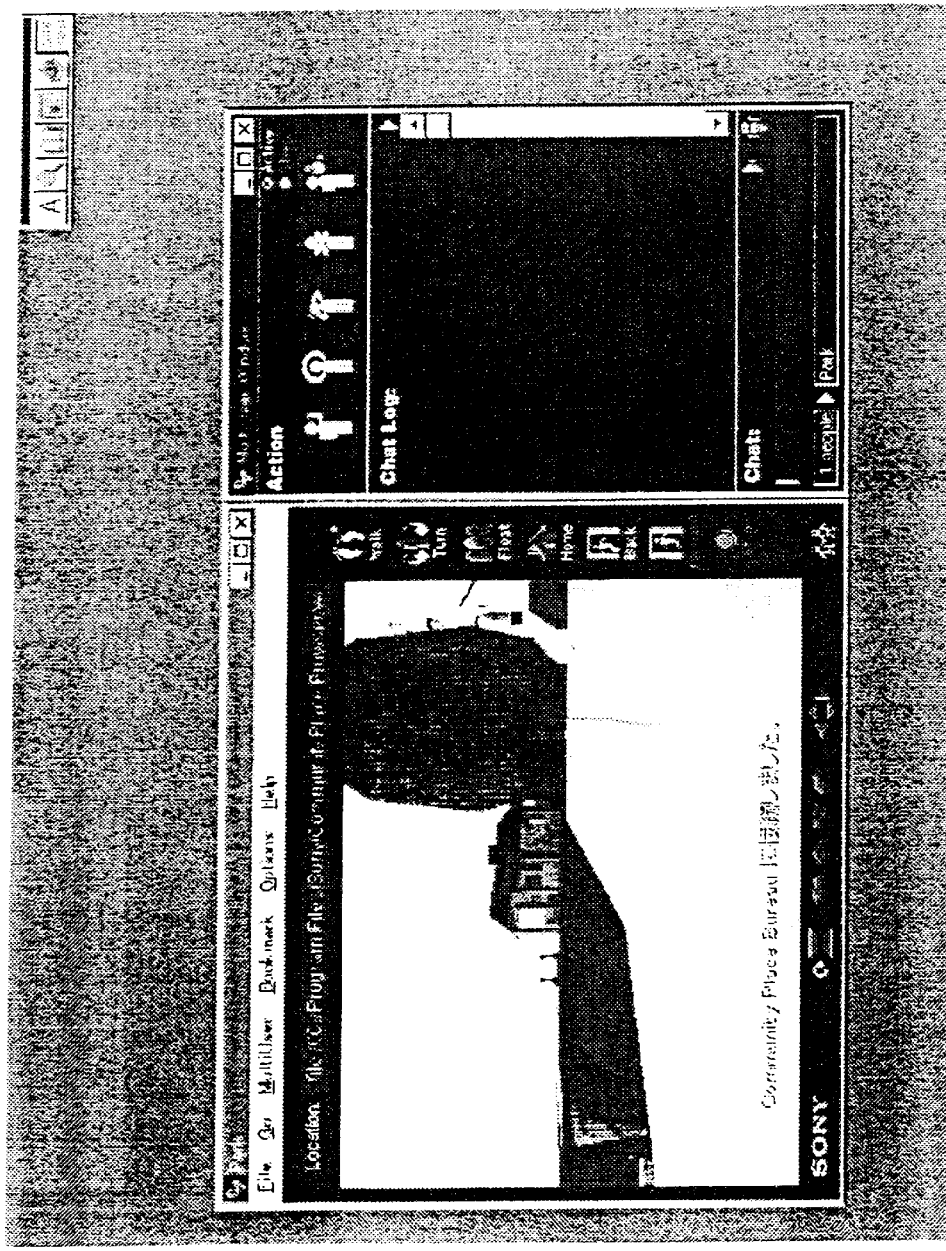
FIG. 17 shows a photograph indicative of a display example of a shared virtual space.

The following describes particular examples of display on the CRT monitor on a client PC. FIG. 17 shows an example to be displayed on the CRT monitor 45 when access is made from the client PC 1 to the shared server 12 for example. In this display example, a message "Connected to Community Place Bureau" is superimposed on the image in a three-dimensional shared virtual space. It should be noted that, on the right side of this screen, an area "Chat Log:" in which chat contents are displayed and various action buttons are arranged.

Figure 18:
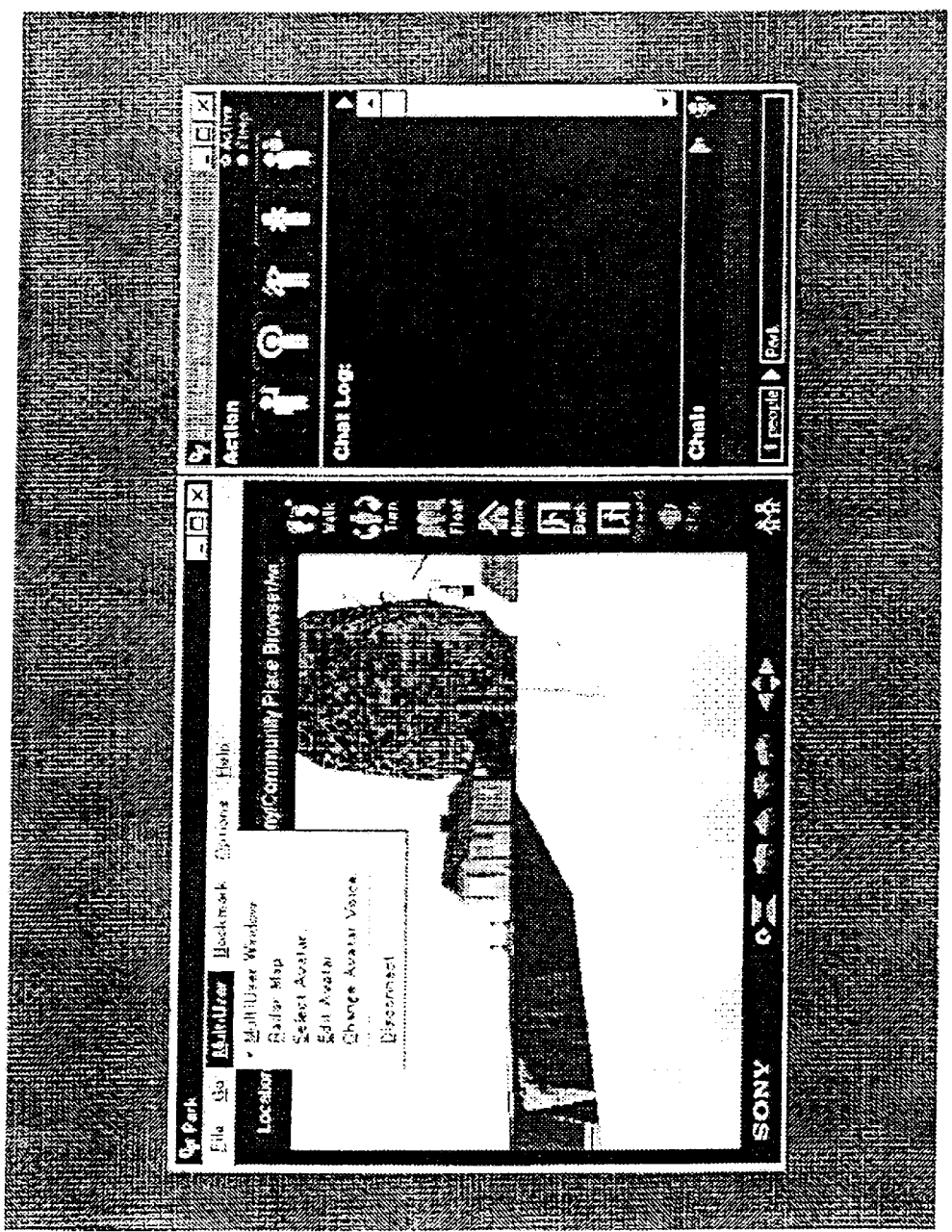
FIG. 18 shows a photograph indicative of another display example of the shared virtual space.
Figure 19:
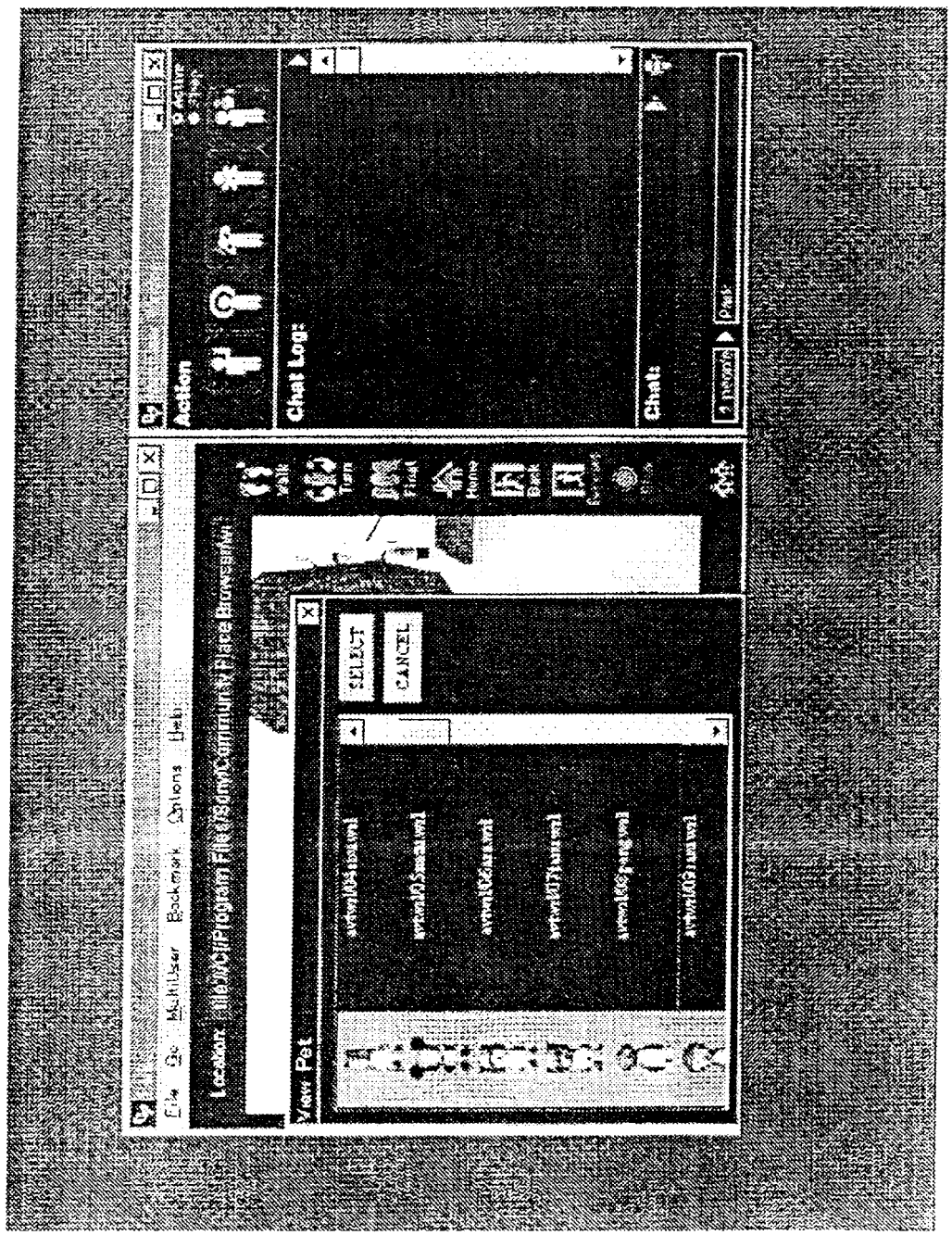
FIG. 19 shows a photograph indicative of still another display example of the shared virtual space.

To select a virtual pet to be bred in the shared virtual space, the user clicks "Multi User" item in the screen. When this item is clicked, a menu bar appears as shown in FIG. 18. From the menu bar, the user selects "Select Pet." Then, "View Pet" window appears as shown in FIG. 19, in which various pet images are displayed. The user selects a desired one of these pets. It should be noted that the images of pets displayed in the "View Pet" window are the initial images, namely the images at their births. As described earlier, the image of each pet gradually changes as it grows. When the user has determined the pet to be bred, the user presses the "SELECT" button with the mouse 41.

Figure 20:
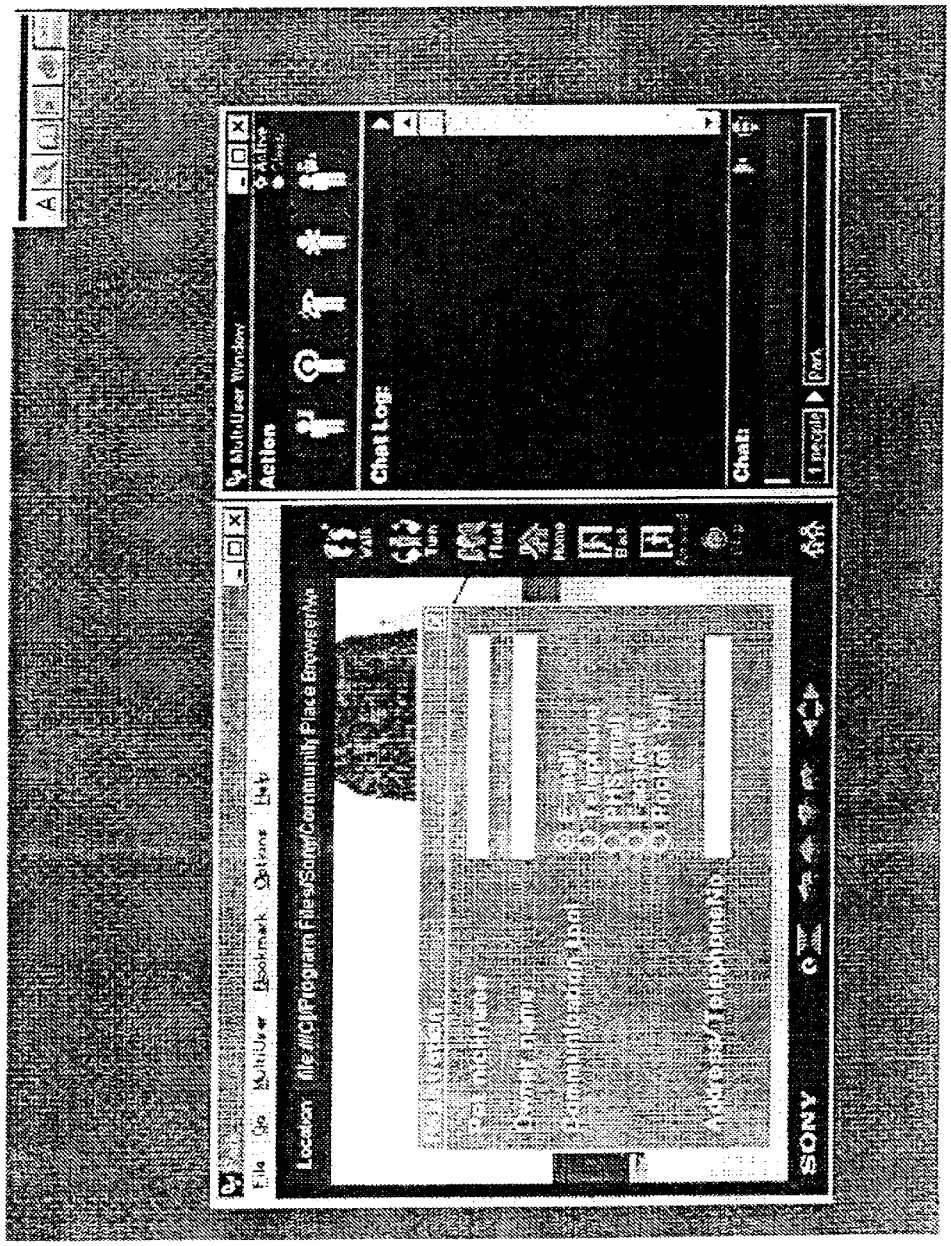
FIG. 20 shows a photograph indicative of yet another display example of the shared virtual space.

When the selection of the pet has been completed, a window "Registration" for registering the information about the selected pet appears as shown in FIG. 20. The user enters the name of the pet "Pet Nickname," the name of the owner (keeper of the pet) "Owner Name," and the address and telephone number "Address/Telephone No." of the owner from the keyboard 42.

Further, the user selects a communication tool as the above-mentioned contacting means or notification means from "E-mail," "Telephone," "PHS-mail," "Facsimile," and "Pocket Bell (pager)."

Figure 21:
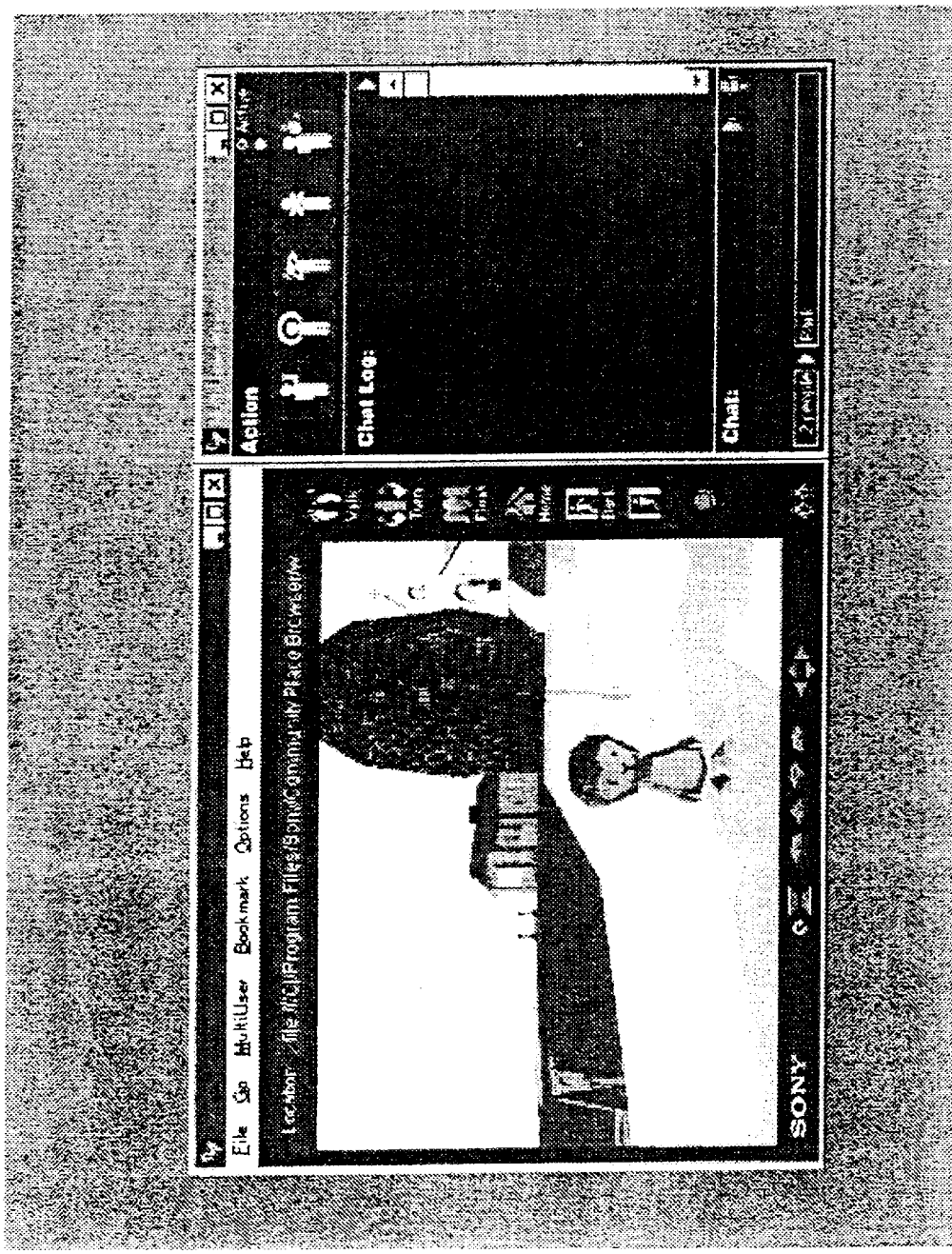
FIG. 21 shows a photograph indicative of a different display example of the shared virtual space.
Figure 22:
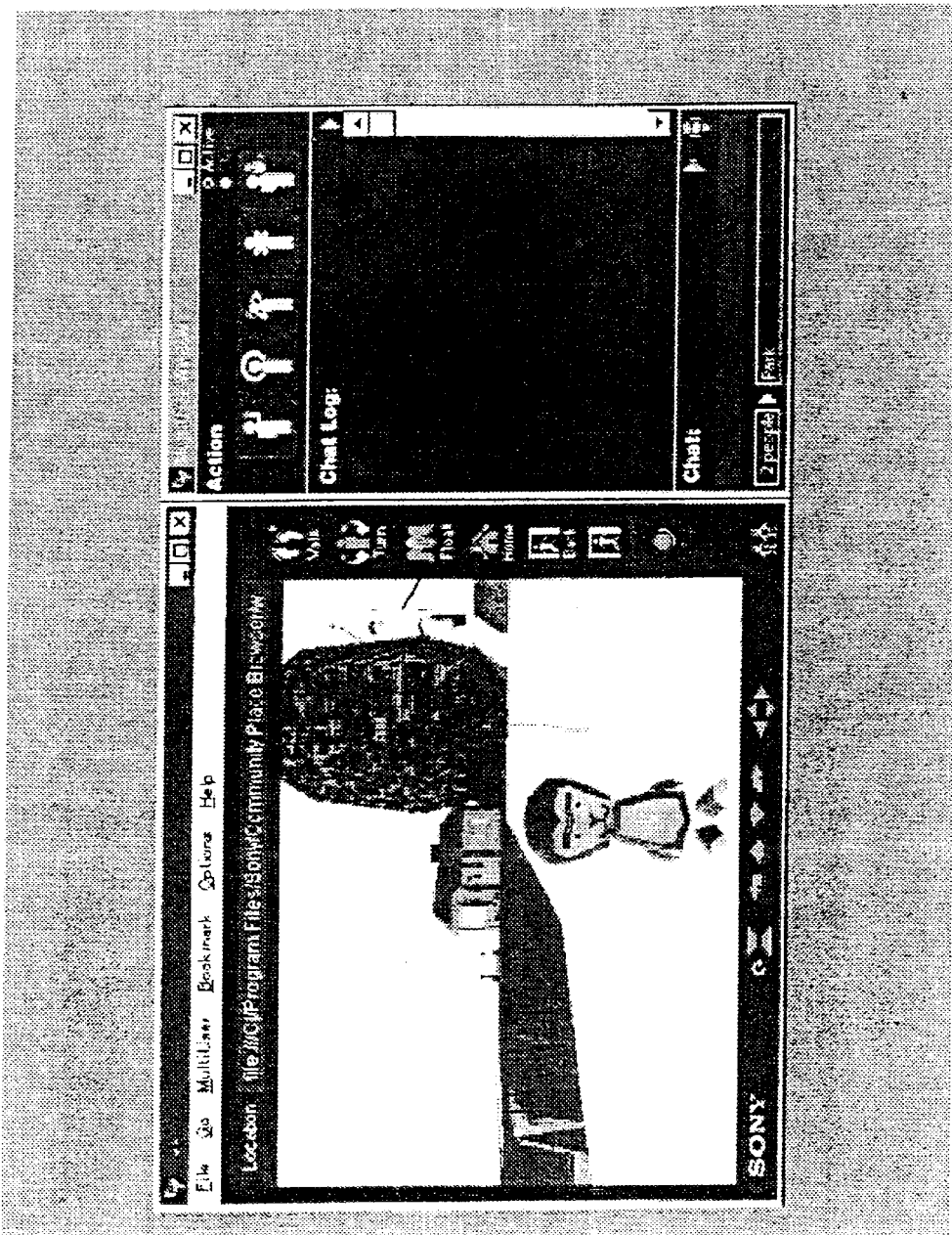
FIG. 22 shows a photograph indicative of a still different display example of the shared virtual space.

FIG. 21 shows an example in which a monkey for example has been selected as the virtual pet. As described earlier, this virtual pet (monkey) grows based on growth parameters to be updated by various events. FIG. 22 shows a state of the pet in which it has grown from the state shown in FIG. 21. As shown in FIG. 22, the pet is larger in physique and its countenance has changed to that of an adult monkey.

Thus, changes closer to reality can be enjoyed in a shared virtual space.

As described above, two or more users share a virtual creature and breed the same while keeping communication with it, thereby affecting the character building of the virtual creature. In addition, dynamically changing the appearance and behavior of a virtual creature as it grows can realize a shared virtual space providing system in which the growth process of a virtual creature closer to that of a real creature can be represented.

It should be noted that the program for executing the above-mentioned processing operations can be provided in a floppy disc, a CD-ROM disc, or another recording medium, or through the Internet or the other network.

As described and according to the program providing medium desdribed in claim 1, the shared virtual space providing apparatus described in claim 10, and the shared virtual space providing method described in claim 11, a message is sent to the keeper of a virtual life object at his or her address of contact according to the state of the virtual life object by use of a notification method registered in a communication control table. This novel constitution allows the user to remotely acquire the information associated with the growth process of the virtual creature and remotely breed the same.

While the preferred embodiments of the present invention have been described using specific terms, such description is for illustrative purposes only, and it is to be understood that changes and variations may be made without departing from the spirit or scope of the appended claims.

What is claimed is:

1. A program providing medium for providing a program for controlling a shared virtual space providing apparatus for providing a shared virtual space to a plurality of client apparatuses connected to said shared virtual space providing apparatus through a network and for controlling an autonomous behavior of a virtual life object existing in said shared virtual space, said program comprising the steps of:

controlling a communication control table in which a user of said client apparatus who is a keeper of said virtual life object, a notification method of sending a message to said keeper, and an address of contact of said keeper are registered;

controlling a growth parameter control table in which data is classified as virtual life data and keeper data; and sending said message to said address of contact according to a status transition of said virtual life object by use of said notification method registered in said communication control table, wherein the virtual life object is configured to undergo continuous autonomous transformation based on modifiable growth parameters comprising physical parameters and mental parameters, and wherein the modifiable growth parameters are sequentially updated to values computed by a predetermined growth parameter computing equation based on a timer event caused when a predetermined time has passed after a birth date initialized by said keeper.

2. A program providing medium as claimed in claim 1, wherein an identification for identifying said keeper of said virtual life object and a history of access by said keeper to said virtual life object are registered in said communication control table and, in the sending step, said message is sent to said keeper if the same has not accessed said virtual life object for over a certain period determined by the access history.

3. A program providing medium as claimed in claim 2, wherein, in the sending step, said message is suitably selected from among a plurality of message statements.

4. A program providing medium as claimed in claim 1, wherein, in the sending step, said message is suitably selected from among a plurality of message statements based on an updated content of a status transition control table for controlling a status transition of said virtual life object and the selected message is sent to said keeper.

5. A program providing medium as claimed in claim 1, wherein an electronic mail address of said keeper of said virtual life object is registered in said communication control table and,
   in the sending step, said message based on text is sent to said electronic mail address.

6. A program providing medium as claimed in claim 1, wherein a telephone number of said keeper of said virtual life object is registered in said communication control table as an address of contact of said keeper and,
   in the sending step, said message based on voice is sent to said keeper by originating a call at said telephone number.

7. A program providing medium as claimed in claim 1, wherein a facsimile number of said keeper of said virtual life object is registered in said communication control table and,
   in the sending step, said message based on facsimile is sent to said keeper by originating a call at said facsimile number.

8. A program providing medium as claimed in claim 1, said program further comprising the step of:
   interpreting an operation command returned from said keeper along with an identification for identifying said keeper through a simple communication apparatus, recognizing said operation command as a message to said virtual life object, and reflecting content of said operation command onto a status transition of said virtual life object.

9. A program providing medium as claimed in claim 8, wherein said simple communication apparatus is a telephone and said operation command is a dual-tone multi-frequency signal to be generated by operating a push-button for example of said telephone.

10. A shared virtual space providing apparatus connected to a plurality of client apparatuses through a network to provide a shared virtual space to said plurality of client apparatuses and control an autonomous behavior of a virtual life object existing in said shared virtual space, comprising:
   a control means for controlling a communication control table in which a user of each of said plurality of client apparatuses who is a keeper of said virtual life object, a notification method of sending a message to said keeper, and an address of contact of said keeper are registered;
   a growth parameter control table in which data is classified as virtual life data and keeper data; and
   a sending means for sending said message to said keeper at said address of contact registered in said communication control table according to a status transition of said virtual life object by use of said notification method registered in said communication control table, wherein the virtual life object is configured to undergo continuous autonomous transformation based on modifiable growth parameters comprising physical parameters and mental parameters, and wherein the modifiable growth parameters are sequentially updated to values computed by a predetermined growth parameter computing equation based on a timer event caused when a predetermined time has passed after a birth date initialized by said keeper.

11. A shared virtual space providing method for a shared virtual space providing apparatus connected to a plurality of client apparatuses through a network to provide a shared virtual space to said plurality of client apparatuses and control an autonomous behavior of a virtual life object existing in said shared virtual space, comprising the steps of:
   controlling a communication control table in which a user of each of said plurality of client apparatuses who is a keeper of said virtual life object, a notification method of sending a message to said keeper, and an address of contact of said keeper are registered;
   controlling a growth parameter control table in which data is classified as virtual life data and keeper data; and
   sending said message to said keeper at said address of contact registered in said communication control table according to a status transition of said virtual life object by use of said notification method registered in said communication control table, wherein the virtual life object is configured to undergo continuous autonomous transformation based on modifiable growth parameters comprising physical parameters and mental parameters, and wherein the modifiable growth parameters are sequentially updated to values computed by a predetermined growth parameter computing equation based on a timer event caused when a predetermined time has passed after a birth date initialized by said keeper.

12. A program providing medium according to claim 1, wherein the virtual life data includes at least one of a 3D object ID for uniquely identifying a 3D object in one shared virtual space, and 3D coordinate values representing the virtual life object in the shared virtual space.

13. A program providing medium according to claim 12, wherein the virtual life data further includes at least one of a type of the virtual life object, a gender of the virtual life object, an identification of the virtual life object, and a world name given to the shared virtual space in which the virtual life object was born.

14. A program providing medium according to claim 12, wherein the growth parameters include parameters for specifying external growth and mental parameters.

15. A shared virtual space providing apparatus according to claim 10, wherein the virtual life data includes at least one of a 3D object ID for uniquely identifying a 3D object in one shared virtual space, and 3D coordinate values representing the virtual life object in the shared virtual space.

16. A shared virtual space providing apparatus according to claim 15, wherein the virtual life data further includes at least one of a type of the virtual life object, a gender of the virtual life object, an identification of the virtual life object, and a world name given to the shared virtual space in which the virtual life object was born.

17. A shared virtual space providing apparatus according to claim 15, wherein the growth parameters include parameters for specifying external growth and mental parameters.

18. A shared virtual space providing method according to claim 11, wherein the virtual life data includes at least one of a 3D object ID for uniquely identifying a 3D object in one shared virtual space, and 3D coordinate values representing the virtual life object in the shared virtual space.

19. A shared virtual space providing method according to claim 18, wherein the virtual life data further includes at least one of a type of the virtual life object, a gender of the virtual life object, an identification of the virtual life object, and a world name given to the shared virtual space in which the virtual life object was born.

20. A shared virtual space providing method according to claim 18, wherein the growth parameters include parameters for specifying external growth and mental parameters.

* * * * *

UNITED STATES PATENT AND TRADEMARK OFFICE
CERTIFICATE OF CORRECTION

PATENT NO. : 6,577,328 B2
DATED : June 10, 2003
INVENTOR(S) : Koichi Matsuda et al.

It is certified that error appears in the above-identified patent and that said Letters Patent is hereby corrected as shown below:

Column 1,
Line 51, insert "one's" before -- own --;

Column 2,
Line 65, change "appararus" to -- apparatus --;

Column 7,
Line 26, change "an" to -- a --;

Column 8,
Line 2, change "webspac e" to -- webspace --;

Column 10,
Line 19, change "identify" to -- identifying --;
Line 57, delete "of";

Column 11,
Line 36, change "FIGS." to -- FIG. --;

Column 12,
Line 49, change "than" to -- hand --;

Column 13,
Line 3, change "describe" to -- described --;

Column 17,
Line 20, delete "by";

UNITED STATES PATENT AND TRADEMARK OFFICE
CERTIFICATE OF CORRECTION

PATENT NO.    : 6,577,328 B2
DATED         : June 10, 2003
INVENTOR(S)   : Koichi Matsuda et al.

It is certified that error appears in the above-identified patent and that said Letters Patent is hereby corrected as shown below:

Column 18,
Line 14, change "desdribed" to -- described --

Signed and Sealed this

Ninth Day of August, 2005

JON W. DUDAS
*Director of the United States Patent and Trademark Office*